US012591446B2

(12) United States Patent
Berry et al.

(10) Patent No.: US 12,591,446 B2
(45) Date of Patent: Mar. 31, 2026

(54) CONFIGURING VIRTUALIZATION SYSTEM IMAGES FOR A COMPUTING CLUSTER

(71) Applicant: Nutanix, Inc., San Jose, CA (US)

(72) Inventors: Joshua John Berry, Redwood City, CA (US); Mohan Maturi, San Jose, CA (US); Shlomo Shlomi Vaknin, San Jose, CA (US); Aman Nijhawan, Seattle, WA (US); Anil Kumar Kushwah, Bengaluru (IN); Avi Bhandari, San Jose, CA (US); Jan Ralf Alexander Olderdissen, Herrenberg (DE)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/216,511

(22) Filed: Jun. 29, 2023

(65) Prior Publication Data

US 2024/0069952 A1 Feb. 29, 2024

Related U.S. Application Data

(63) Continuation of application No. 17/139,541, filed on Dec. 31, 2020, now Pat. No. 11,734,044.

(51) Int. Cl.
*H04L 67/10* (2022.01)
*G06F 8/60* (2018.01)
(Continued)

(52) U.S. Cl.
CPC ............ *G06F 9/45558* (2013.01); *G06F 8/60* (2013.01); *H04L 67/10* (2013.01); *G06F 2009/45579* (2013.01)

(58) Field of Classification Search
CPC .................. G06F 9/45558; G06F 8/60; G06F 2009/45579; H04L 67/10
(Continued)

(56) References Cited

U.S. PATENT DOCUMENTS 7,843,907 B1 11/2010 Abou-Emara et al.
7,990,994 B1 8/2011 Yeh et al.
(Continued)

FOREIGN PATENT DOCUMENTS

CN 104935455 A 9/2015
CN 107454019 12/2017
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — David R Lazaro
*Assistant Examiner* — Berhanu Shitayewoldetadik
(74) *Attorney, Agent, or Firm* — Vista IP Law Group, LLP

(57) ABSTRACT

A plurality of different virtualization system images are configured for deployment to a plurality of nodes in heterogeneous environments. Individual ones of the virtualization system images are configured such that once deployed, the nodes form a computer cluster having a storage pool that is shared across the nodes. When configuring the virtualization system images, information that describes the heterogeneous computing environments is accessed, and constraints pertaining the heterogeneous computing environments are reconciled in advance of configuring the different virtualization system images. A common subnet across the heterogeneous environments is established. The plurality of different virtualization system images are configured to access the common subnet once deployed. The common subnet serves as a storage I/O communication path over which a cluster-wide storage pool is implemented. The virtualization system images are configured to correspond to address portions of (Continued)

a contiguous address space that is used to access data in the storage pool.

24 Claims, 12 Drawing Sheets

(51) Int. Cl.
  *G06F 9/455* (2018.01)
  *G06F 15/16* (2006.01)
  *H04L 15/16* (2006.01)

(58) Field of Classification Search
  USPC .......................................................... 718/1
  See application file for complete search history.

(56) References Cited

U.S. PATENT DOCUMENTS

| | | | |
|---|---|---|---|
| 8,195,760 B2 | 6/2012 | Lacapra et al. | |
| 8,200,700 B2 | 6/2012 | Moore et al. | |
| 8,345,692 B2 | 1/2013 | Smith | |
| 8,347,088 B2 | 1/2013 | Moore et al. | |
| 8,549,518 B1* | 10/2013 | Aron | G06F 9/45558 |
| | | | 718/1 |
| 8,555,383 B1 | 10/2013 | Marshall et al. | |
| 8,601,473 B1* | 12/2013 | Aron | G06F 16/128 |
| | | | 718/1 |
| 8,660,129 B1 | 2/2014 | Brendel et al. | |
| 8,713,295 B2 | 4/2014 | Bax et al. | |
| 8,743,872 B2 | 6/2014 | Chidambaram et al. | |
| 8,850,130 B1 | 9/2014 | Aron et al. | |
| 9,087,319 B2 | 7/2015 | Nguyen | |
| 9,141,625 B1 | 9/2015 | Thornewell et al. | |
| 9,154,327 B1 | 10/2015 | Marino et al. | |
| 9,354,912 B1* | 5/2016 | Aron | G06F 9/45558 |
| 9,652,265 B1* | 5/2017 | Narayanasamy | G06F 13/10 |
| 9,712,486 B2 | 7/2017 | Johnson et al. | |
| 9,772,866 B1 | 9/2017 | Aron et al. | |
| 9,813,303 B1 | 11/2017 | Guigli | |
| 10,210,567 B2 | 2/2019 | Mick et al. | |
| 10,268,593 B1* | 4/2019 | Olson | G06F 3/067 |
| 10,447,806 B1* | 10/2019 | Sahay | H04L 41/12 |
| 10,637,724 B2 | 4/2020 | Johnson et al. | |
| 10,637,916 B2* | 4/2020 | Ding | G06F 3/0613 |
| 10,693,715 B1 | 6/2020 | Strauss et al. | |
| 10,708,082 B1 | 7/2020 | Bakiaraj et al. | |
| 10,742,557 B1 | 8/2020 | Miriyala et al. | |
| 10,862,852 B1 | 12/2020 | Thunga et al. | |
| 10,902,062 B1* | 1/2021 | Guha | G06F 16/9027 |
| 10,921,991 B1* | 2/2021 | Olson | G06F 3/0619 |
| 11,108,629 B1 | 8/2021 | Cahyadi et al. | |
| 11,159,366 B1 | 10/2021 | Gawade et al. | |
| 11,196,591 B2 | 12/2021 | Hira et al. | |
| 11,316,822 B1 | 4/2022 | Gawade et al. | |
| 11,611,618 B2 | 3/2023 | Nijhawan et al. | |
| 2005/0257072 A1* | 11/2005 | Cross | H04L 63/08 |
| | | | 713/193 |
| 2006/0253570 A1* | 11/2006 | Biswas | H04W 84/18 |
| | | | 709/224 |
| 2010/0077158 A1* | 3/2010 | Asano | G06F 3/067 |
| | | | 711/E12.006 |
| 2010/0191779 A1* | 7/2010 | Hinrichs | G06F 16/9535 |
| | | | 711/170 |
| 2010/0228798 A1* | 9/2010 | Kodama | H04L 67/104 |
| | | | 709/227 |
| 2011/0282975 A1* | 11/2011 | Carter | G06F 9/5055 |
| | | | 709/224 |
| 2012/0117229 A1* | 5/2012 | Van Biljon | H04L 67/60 |
| | | | 709/224 |
| 2012/0233668 A1* | 9/2012 | Leafe | G06F 9/44526 |
| | | | 726/4 |
| 2013/0104251 A1 | 4/2013 | Moore et al. | |
| 2013/0136123 A1 | 5/2013 | Ge et al. | |
| 2013/0205028 A1* | 8/2013 | Crockett | G06F 9/5066 |
| | | | 709/226 |
| 2013/0238785 A1* | 9/2013 | Hawk | G06F 9/5072 |
| | | | 709/224 |
| 2014/0025816 A1 | 1/2014 | Otani | |
| 2014/0052877 A1 | 2/2014 | Mao | |
| 2014/0222917 A1* | 8/2014 | Poirier | H04L 67/1097 |
| | | | 709/204 |
| 2014/0282889 A1* | 9/2014 | Ishaya | H04L 63/10 |
| | | | 726/4 |
| 2014/0317314 A1* | 10/2014 | Nigam | H04L 61/50 |
| | | | 709/245 |
| 2014/0337500 A1* | 11/2014 | Lee | H04L 41/12 |
| | | | 709/223 |
| 2015/0036541 A1 | 2/2015 | Xu et al. | |
| 2015/0095788 A1 | 4/2015 | Thiele et al. | |
| 2015/0120887 A1 | 4/2015 | Hu et al. | |
| 2015/0121370 A1* | 4/2015 | Beisiegel | G06F 9/45558 |
| | | | 718/1 |
| 2016/0105471 A1 | 4/2016 | Nunes et al. | |
| 2016/0203528 A1 | 7/2016 | Saha et al. | |
| 2016/0216909 A1* | 7/2016 | Provenzano | G06F 16/1844 |
| 2016/0218947 A1 | 7/2016 | Hughes et al. | |
| 2016/0218991 A1 | 7/2016 | Sharabi et al. | |
| 2016/0248732 A1* | 8/2016 | Kolesnik | H04L 61/5061 |
| 2016/0285970 A1* | 9/2016 | Cai | H04L 69/162 |
| 2016/0337272 A1 | 11/2016 | Berman | |
| 2016/0352735 A1* | 12/2016 | Zou | H04L 61/2514 |
| 2016/0357642 A1 | 12/2016 | Burshan et al. | |
| 2017/0033976 A1 | 2/2017 | Ahmed et al. | |
| 2017/0093790 A1* | 3/2017 | Banerjee | H04L 67/131 |
| 2017/0093910 A1* | 3/2017 | Gukal | H04L 63/1491 |
| 2017/0163475 A1* | 6/2017 | Olson | G06F 11/2035 |
| 2017/0171019 A1 | 6/2017 | Nayak et al. | |
| 2017/0180211 A1* | 6/2017 | Johnson | H04L 41/20 |
| 2017/0223117 A1* | 8/2017 | Messerli | H04L 47/783 |
| 2017/0310706 A1* | 10/2017 | Wu | H04L 63/029 |
| 2018/0011874 A1 | 1/2018 | Lacapra et al. | |
| 2018/0026904 A1* | 1/2018 | Van De Groenendaal | |
| | | | G06F 1/183 |
| 2018/0049043 A1 | 2/2018 | Hoffberg et al. | |
| 2018/0063231 A1 | 3/2018 | Park | |
| 2018/0063233 A1 | 3/2018 | Park | |
| 2018/0067866 A1* | 3/2018 | Shanbhogue | G06F 11/0787 |
| 2018/0227243 A1 | 8/2018 | Zhang et al. | |
| 2018/0227244 A1 | 8/2018 | Zhang et al. | |
| 2018/0242154 A1 | 8/2018 | Ballard et al. | |
| 2018/0248743 A1 | 8/2018 | Chandrashekhar et al. | |
| 2018/0351851 A1* | 12/2018 | Parthasarathy | H04L 63/123 |
| 2019/0097900 A1* | 3/2019 | Rodriguez | G06F 9/5011 |
| 2019/0109783 A1 | 4/2019 | Kommula et al. | |
| 2019/0158353 A1 | 5/2019 | Johnson et al. | |
| 2019/0166192 A1* | 5/2019 | Ding | G06F 3/067 |
| 2019/0212944 A1* | 7/2019 | Hutchison | G06F 3/0659 |
| 2019/0243687 A1* | 8/2019 | Chen | G06F 11/3433 |
| 2019/0268421 A1* | 8/2019 | Markuze | H04L 67/10 |
| 2019/0278483 A1* | 9/2019 | Mahmood | G06F 3/0604 |
| 2019/0332575 A1* | 10/2019 | Aron | G06F 9/45533 |
| 2019/0342160 A1* | 11/2019 | Baddepudi | H04L 67/52 |
| 2019/0349426 A1 | 11/2019 | Smith et al. | |
| 2020/0026579 A1* | 1/2020 | Bahramshahry | G06F 9/5077 |
| 2020/0034063 A1* | 1/2020 | Somasundaram | G06F 9/45558 |
| 2020/0099745 A1* | 3/2020 | Diaconu | G06F 11/2097 |
| 2020/0125690 A1* | 4/2020 | Kim | G06F 30/30 |
| 2020/0134479 A1 | 4/2020 | Parthasarathy | |
| 2020/0175854 A1* | 6/2020 | Dousse | G01C 21/3815 |
| 2020/0177452 A1* | 6/2020 | Schardt | H04L 41/0813 |
| 2020/0225924 A1* | 7/2020 | Sathyanarayanamurthy | |
| | | | G06F 8/61 |
| 2020/0225925 A1* | 7/2020 | Sathyanarayanamurthy | |
| | | | H04L 43/10 |
| 2020/0250153 A1 | 8/2020 | Krivenok | |
| 2020/0280492 A1 | 9/2020 | Devireddy | |
| 2020/0344296 A1 | 10/2020 | Jain et al. | |
| 2020/0394071 A1 | 12/2020 | Panse et al. | |
| 2020/0396176 A1 | 12/2020 | Lochhead | |
| 2020/0396179 A1 | 12/2020 | Lochhead et al. | |
| 2020/0396181 A1 | 12/2020 | Lochhead et al. | |

(56) References Cited

U.S. PATENT DOCUMENTS

| | | | | |
|---|---|---|---|---|
| 2020/0401457 A1 | 12/2020 | Singhal et al. | | |
| 2021/0067468 A1 | 3/2021 | Cidon et al. | | |
| 2021/0132928 A1* | 5/2021 | Xiao | | H04L 9/3239 |
| 2021/0218672 A1* | 7/2021 | Mackie | | H04L 61/256 |
| 2021/0224093 A1* | 7/2021 | Fu | | G06F 9/5072 |
| 2021/0234715 A1 | 7/2021 | Liu et al. | | |
| 2021/0311760 A1 | 10/2021 | Oki et al. | | |
| 2021/0334004 A1 | 10/2021 | Krivenok | | |
| 2021/0350596 A1 | 11/2021 | Nunez | | |
| 2021/0360075 A1* | 11/2021 | Islam | | H04L 63/0272 |
| 2021/0367884 A1 | 11/2021 | Drake et al. | | |
| 2022/0124150 A1* | 4/2022 | Alagna | | H04L 61/4511 |
| 2022/0206832 A1 | 6/2022 | Berry et al. | | |
| 2022/0210226 A1 | 6/2022 | Nijhawan et al. | | |
| 2022/0357958 A1* | 11/2022 | Deokule | | H04L 67/10 |
| 2023/0025529 A1* | 1/2023 | Fu | | G06F 9/4406 |
| 2023/0362245 A1 | 11/2023 | Nijhawan et al. | | |

FOREIGN PATENT DOCUMENTS

| | | | | |
|---|---|---|---|---|
| CN | 109565467 | 4/2019 | | |
| EP | 3731461 | 10/2020 | | |
| JP | 2016039531 | 3/2016 | | |
| JP | 2020510325 | 4/2020 | | |
| WO | WO-2005076553 A1 * | 8/2005 | | H04L 45/02 |
| WO | WO 2005106659 | 11/2005 | | |
| WO | WO-2005106659 A1 * | 11/2005 | | G06F 9/45533 |
| WO | WO 2014041394 | 3/2014 | | |
| WO | WO-2014041394 A1 * | 3/2014 | | G06F 9/4856 |
| WO | WO 2015069573 | 5/2015 | | |
| WO | WO 2015123849 | 8/2015 | | |
| WO | WO 2015180056 | 12/2015 | | |
| WO | WO 2016069382 | 5/2016 | | |
| WO | WO 2016165139 | 10/2016 | | |
| WO | WO 2016165142 | 10/2016 | | |
| WO | WO 2018134911 | 7/2018 | | |
| WO | WO 2022019930 | 1/2022 | | |
| WO | WO-2022019930 A1 * | 1/2022 | | G06F 21/52 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", 14th USENIX Symposium on Networked Systems Design and Implementation, NSDI '17, (Mar. 27, 2017).
"A Simple, Scalable Way to Extend Your Connectivity Reach Across Data Centers," Equinix, copyright 2019.
Bowker, M., "Interconnection Amplifies the Value of Bare Metal Deployments," ESG White Paper, The Enterprise Strategy Group, Inc., dated Oct. 2020.
"Building Stateless/Diskless Images," IBM Corporation, date found via Internet Archive as Sep. 14, 2016, URL: https://xcat-docs.readthedocs.io/en/stable/advanced/mixed_cluster/building_stateless_images.html.
"Node images," Google Cloud, date found via Internet Archives are Jul. 18, 2021, URL: https://cloud.google.com/kubernetes-engine/docs/concepts/node-images.
"Specifying a node image," Google Cloud, date found via Internet Archives as Aug. 16, 2021, URL: https://cloud.google.com/kubernetes-engine/docs/how-to/node-images.
Vallée, G., et al., "SSI-OSCAR: a Cluster Distribution for High Performance Computing Using a Single System Image," Proceedings of the 19th International Symposium on High Performance Computing Systems and Applications, copyright 2005.
"Bigstep Metal Cloud vs AWS", Bigstep, date found via Internet Archive as Feb. 14, 2020, URL: https://bigstep.com//bigstep-vs-aws.
"Metal Cloud Distributed MicroSAN Storage," Bigstep, date found via Internet Archive as Feb. 14, 2020, URL: https://bigstep.com//distributed-storage.
"Looking for an alternative to Dedicated Servers?," Bigstep, date found via Internet Archive as Jul. 27, 2020, URL: https://bigstep.com//bigstep-vs-dedicated-servers.
"Bigstep Container Service," Bigstep, date found via Internet Archive as Feb. 14, 2020, URL: https://bigstep.com//products/bigstep-container-service.
"An Infrastructure as a Service Serious Wordbook," Bigstep, dated Apr. 3, 2019, URL: https://bigstep.com/blog/an-infrastructure-as-a-service-serious-wordbook.
Lim, E., et al., "Self-provisioning and configuration system for heterogeneous diskless cluster system," IEEE, dated 2015.
"Bigstep delivers giant leap in performance with Full Metal Cloud," Hewlett Packard Enterprise, date found via Google as Feb. 15, 2016.
Pintoiu, C., "MongoDB vs DocumentDB," BigStep, date found via Google as Apr. 1, 2019.
Non-Final Office Action dated May 12, 2022 for related U.S. Appl. No. 17/139,541.
Notice of Allowance for U.S. Appl. No. 17/187,698 dated May 17, 2022.
Aviatrix Systems, "Aviatrix Transit Architecture for Azure", Aviatrix Docs, (Oct. 28, 2020), (Publication date based on indicated capture date by Archive.org; first publication date unknown).
Aviatrix Systems, "Aviatrix Next Gen Transit with customized SNAT and DNAT features", Aviatrix Docs, (Oct. 28, 2020), (Publication date based on indicated capture date by Archive.org; first publication date unknown).
Aviatrix Systems, "Gateway", Aviatrix Docs, (Oct. 28, 2020), (Publication date based on indicated capture date by Archive.org; first publication date unknown).
VMware, "Deploy the NSX Public Cloud Gateway", VMware Docs, (Jun. 19, 2020).
VMware, "Azure VMware Solution Planning and Deployment Guide", (Sep. 1, 2021), (Publication date based on indicated capture date by Archive.org; first publication date unknown).
Chebaro, S. "Step By Step Deploy VMware NSX with Microsoft Azure IPSEC VPN Site-to-Site", Zero to Hero, (Mar. 17, 2017).

(56) References Cited

OTHER PUBLICATIONS

IBM, "Planning for Bare Metal Servers on VPC", IBM Cloud Docs, (Last updated Jan. 21, 2022).

IBM, "VMware NSX-T logical routers on VPC deployments", IBM Cloud Docs, (Last updated Jun. 21, 2022).

Google, "Private access options for services", Google Cloud, (Last updated Nov. 16, 2020).

Google, "Private Google Access", Google Cloud, (Last updated May 12, 2021).

Hosken, M. et al., "Data Center Modernization with VMware Cloud on AWS", VMware, First edition, (Sep. 2019).

AWS, "Example routing options", Amazon Virtual Private Cloud, user guide, (Oct. 26, 2020), (Publication date based on indicated capture date by Archive.org; first publication date unknown).

Notice of Allowance for U.S. Appl. No. 17/187,698 dated Nov. 16, 2022.

Final Office Action for U.S. Appl. No. 17/139,541 dated Nov. 28, 2022.

Notice of Allowance dated Mar. 29, 2023 for U.S. Appl. No. 17/139,541.

Kumar, R., et al., "Open Source Infrastructure for Cloud Computing Platform Using Eucalyptus," Global Journal of Computers & Technology, vol. 1, No. 2, dated Dec. 24, 2014, ISSN: 2394-501X.

Jacquemart, Q., et al., "D3.3—Inter-site Network Virtualization Orchestrator," dated May 3, 2018.

Janiszewski, C., et al., "A blueprint for OpenStack and bare metal," Red Hat Blog, URL: https://www.redhat.com/en/blog/blueprint-openstack-and-bare-metal, dated Dec. 3, 2019.

"Oracle® SuperCluster M8 and SuperCluster M7 Security Guide," Oracle, dated Jun. 2020.

"Sparc M8 and Sparc M7 Servers Administration Guide," Oracle, dated Sep. 2017.

"Multi-tenant design considerations for Amazon EKS clusters," AWS, URL: https://aws.amazon.com/blogs/containers/multi-tenant-design-considerations-for-amazon-eks-clusters/, dated Mar. 27, 2020.

Ango, A., "How to create a Kubernetes cluster on Amazon EKS in GitLab," dated Mar. 9, 2020.

"Managed Kubernetes Clusters," AWS, URL: https://web.archive.org/web/20201129204035/https://aws.amazon.com/eks/features/, date found via Internet Archive as Nov. 29, 2020.

"Cluster VPC considerations," AWS, URL: https://web.archive.org/web/20201201060045/https://docs.aws.amazon.com/eks/latest/userguide/network_reqs.html, date found via Internet Archive as Dec. 1, 2020.

Lokare, "Secure Multi-Tenancy for Enterprises and Managed Service Providers," Diamanti, dated Jul. 27, 2020.

"Federated Kubernetes for Stateful Applications," Diamanti, date found via Internet Archive as Aug. 7, 2020.

"Diamanti Spektra 3.0 Simplifies Hybrid Cloud for Kubernetes Applications," Diamanti, dated Jun. 30, 2020.

"Multiple Tenant Access to a Shared Storage Cluster Using Kubernetes," Nexenta, URL: https://nexentaedge.io/docs/multi-tenancy-considerations.html, date found via Google as May 2, 2018.

Non-Final Office Action for U.S. Appl. No. 18/114,946 dated Jan. 5, 2024.

Notice of Allowance for U.S. Appl. No. 18/114,946 dated Sep. 5, 2024.

Final Office Action for U.S. Appl. No. 18/114,946 dated Jun. 25, 2024.

Notice of Allowance for U.S. Appl. No. 18/114,946 dated Jan. 3, 2025.

Notice of Allowance for U.S. Appl. No. 18/114,946 dated May 1, 2025.

* cited by examiner

1B00

5B00

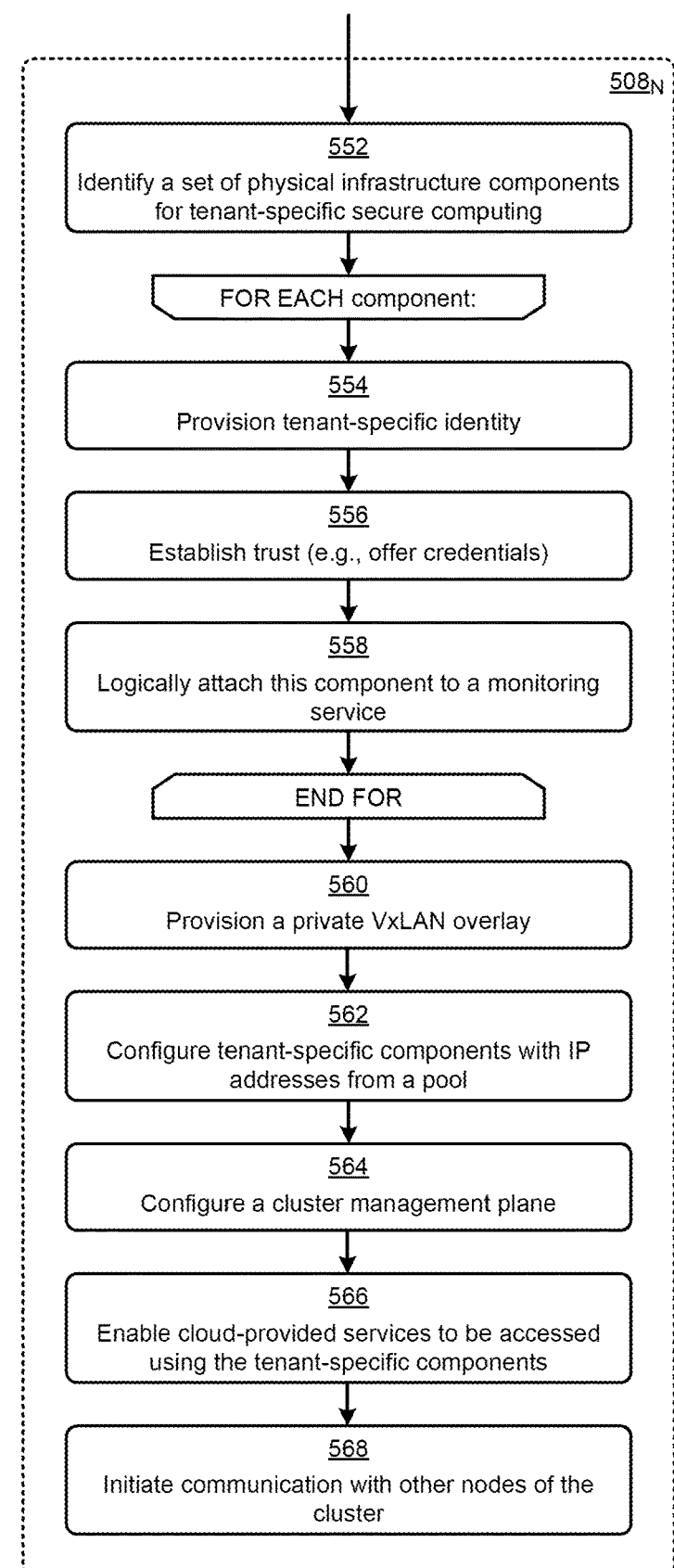

508N

552
Identify a set of physical infrastructure components for tenant-specific secure computing FOR EACH component:

554
Provision tenant-specific identity

556
Establish trust (e.g., offer credentials)

558
Logically attach this component to a monitoring service

END FOR

560
Provision a private VxLAN overlay

562
Configure tenant-specific components with IP addresses from a pool

564
Configure a cluster management plane

566
Enable cloud-provided services to be accessed using the tenant-specific components 568
Initiate communication with other nodes of the cluster

FIG. 5B

CONFIGURING VIRTUALIZATION SYSTEM IMAGES FOR A COMPUTING CLUSTER

RELATED APPLICATION

The present application is a continuation of U.S. patent application Ser. No. 17/139,541 titled "CONFIGURING VIRTUALIZATION SYSTEM IMAGES FOR A COMPUTING CLUSTER", filed on Dec. 31, 2020.

TECHNICAL FIELD

This disclosure relates to managing computing clusters, and more particularly to techniques for configuring virtualization system images for implementing a storage pool formed over a plurality of heterogeneous networks.

BACKGROUND

When creating a computing cluster storage pool on a set of nodes, virtualization system software is loaded onto the nodes. Based on the virtualization system software and knowledge of the networking infrastructure that connects the set of nodes, each of the cluster nodes are configured for network communications to/from each other. The nodes of the cluster are then configured against some particular cluster specification (e.g., handling of metadata, handling of redundancy, configuration for high availability, etc.).

In legacy cases, the configuration of the virtualization system software for a given particular node in a specific environment is nearly identical to the configuration of the virtualization system software for a different homogeneous node in the same environment. However, in recent times, different types of owner/operators of computing infrastructure have emerged. One example is a "cloud computing vendor." Another example is an owner/operator of on-prem equipment for which there is excess capacity. Another example is a so-called "mom-and-pop" outfit that has computing node capacity for letting out as their "bare metal." These different types of owner/operators vary widely with respect to the level of sophistication of their infrastructure. Further, these different types of owner/operators may let-out different types of nodes from different node manufacturers, and may let-out networking infrastructure with different sets of capabilities, etc.

Accordingly, virtualization system software needs to be configured so as to run on the offered nodes using the offered networking infrastructure despite the aforementioned wide variety of infrastructure, and despite the potentially many different access mechanisms, different features, etc. Since there is such a wide variety of environments, as well as such a wide variety of infrastructure components and underlying capabilities, a "one size fits all" approach to configuring a homogeneous virtualization system software image does not work. Rather, each node to be included in a to-be-configured computing cluster storage pool needs to be configured with its own node-specific virtualization system software image such that when the nodes operate together in the context of the intended clustered configuration, the cluster as a whole performs as specified.

This situation becomes more complicated when considering that when deploying nodes (that operate as a cluster) onto offered networking infrastructure, the wide variety of networking infrastructure introduces further problems to be solved before the heterogeneous nodes can indeed operate as a cluster of nodes that share a common storage pool (i.e. in spite of differences between the heterogeneous networks over which the cluster operates).

Unfortunately, when dealing with a heterogeneous set of nodes that communicate over heterogeneous networking infrastructure, configuration of the heterogeneous networking infrastructure must be done in a particular manner. As such, what is needed is a technique or techniques that address an orderly, on-demand bring-up of a computing cluster storage pool in spite of differences of between components of the heterogeneous networking infrastructure.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for configuring virtualization system images for a computing cluster, which techniques advance the relevant technologies to address technological issues with legacy approaches. More specifically, the present disclosure describes techniques used in systems, methods, and in computer program products for configuring virtualization system images to implement a computing cluster on a heterogenous set of nodes. Certain embodiments are directed to technological solutions for performing on-the-fly configuration of different virtualization system images to deploy onto heterogeneous nodes that comprise the computing cluster.

The disclosed embodiments modify and improve over legacy approaches. In particular, the herein-disclosed techniques provide technical solutions that address the technical problems attendant to bringing-up computing clusters formed of heterogeneous nodes that need different but correlated virtualization system images that implement a common cluster-wide common storage pool.

The ordered combination of steps of the embodiments serve in the context of practical applications that perform steps for performing on-the-fly configuration of different virtualization system images to deploy onto heterogeneous nodes that comprise the computing cluster. Such techniques overcome heretofore unsolved technological problems associated with bringing up a computing cluster storage pool formed of heterogeneous nodes that are situated in heterogeneous networks.

Many of the herein-disclosed embodiments for performing on-the-fly configuration of different virtualization system images to deploy onto heterogeneous nodes that comprise the computing cluster are technological solutions pertaining to technological problems that arise in the hardware and software arts that underlie configuring computing clusters. Aspects of the present disclosure achieve performance and other improvements in peripheral technical fields including, but not limited to, hyperconverged, heterogeneous computing platform management and ultra-high-availability computing.

Some embodiments include a sequence of instructions that are stored on a non-transitory computer readable medium. Such a sequence of instructions, when stored in memory and executed by one or more processors, cause the one or more processors to perform a set of acts for performing on-the-fly configuration of different virtualization system images to deploy onto heterogeneous nodes that comprise the computing cluster.

Some embodiments include the aforementioned sequence of instructions that are stored in a memory, which memory is interfaced to one or more processors such that the one or more processors can execute the sequence of instructions to cause the one or more processors to implement acts for performing on-the-fly configuration of different virtualization system images to deploy onto heterogeneous nodes that comprise the computing cluster.

In various embodiments, any combinations of any of the above can be combined to perform any variations of acts for configuring virtualization system images to implement a computing cluster on a heterogenous set of nodes, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 5B presents an alternative networking infrastructure initialization technique as used in systems for implementing a computing cluster on a heterogenous set of nodes, according to an embodiment.

DETAILED DESCRIPTION

Figure 1A:
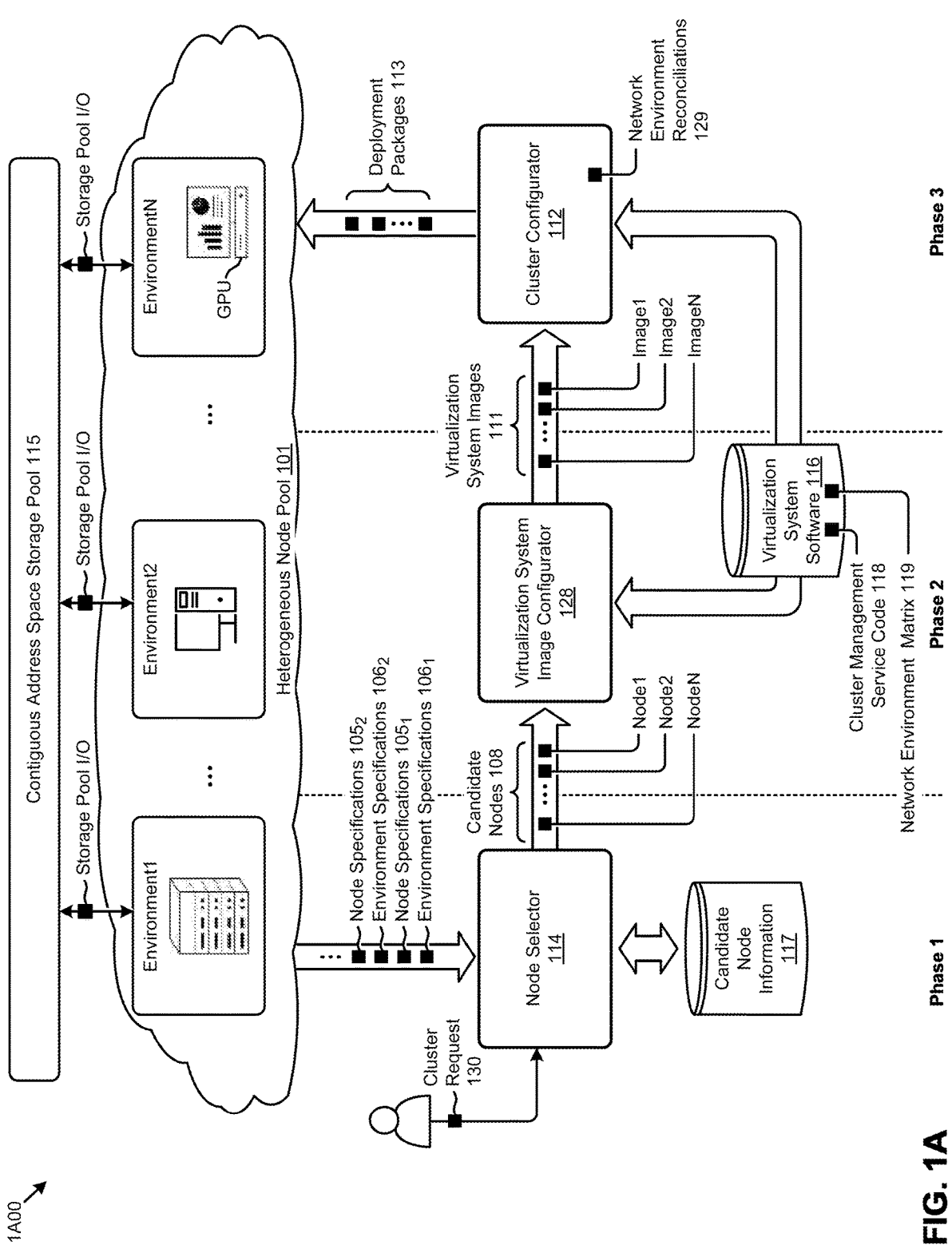
FIG. 1A depicts an environment in which embodiments of the present disclosure can be implemented.

Aspects of the present disclosure solve problems associated with using computer systems for bringing up computing clusters formed of heterogeneous nodes that need different but correlated virtualization system images. These problems are unique to, and may have been created by, various computer-implemented methods for bringing up computing clusters formed of heterogeneous nodes that need different but correlated virtualization system images. Some embodiments are directed to approaches for performing on-the-fly configuration of different virtualization system images to deploy onto heterogeneous environments that host nodes of a computing cluster. The accompanying figures and discussions herein present example environments, systems, methods, and computer program products.

Overview

Application of the herein-disclosed techniques serve to configure node-specific virtualization system images to match various different aspects of different nodes in different environments. The characteristics of each environment and each node are used to drive the selection of software that comprises node-specific virtualization system images to be deployed to those respective nodes.

Once the node-specific virtualization system images have been deployed onto respective nodes of the to-be-configured computing cluster in a manner that defines a networked computing cluster, the nodes interoperate over a shared control plane and a shared storage pool. Different virtual machines at different nodes of the cluster are configured to communicate between each other over the shared control plane. Different virtual machines at different nodes of the cluster are configured to READ and WRITE to and from the shared storage pool.

The initial configuration of such a networked computing cluster having a running virtualization system is fully automated, and no manual intervention is needed to initially bring up the computing cluster. Moreover, the node-specific virtualization system images are configured in such a manner that the constituency of the networked computing cluster can change autonomously (e.g., by adding a node or removing a node), all without requiring manual intervention.

When configuring node-specific virtualization system images, the disclosed techniques address the networking infrastructure that the cluster is operating over. Network parameters such as VLAN designations, IP addresses, and subnets that are used in or by the physical infrastructure that forms the control plane and data paths cluster are characterized and made available to virtual machines and/or applications that are running on the cluster. More specifically, using the herein-disclosed techniques, the system will acquire IP addresses from the various heterogeneous networking environments, and configure individual nodes with their respective IP addresses.

Some embodiments implement or use application programming interfaces (APIs). For example, certain cloud-specific or facility-specific APIs provide mechanisms for choosing and allocating IP addresses corresponding to the cloud-specific or facility-specific infrastructure. The cloud-specific or facility-specific APIs provide mechanisms for configuring the offered network infrastructure to route network traffic throughout the computing cluster and/or to/from network locations outside of the logical boundary of the computing cluster.

To facilitate communication between a node and the underlying infrastructure, each node is configured with its own facility-specific identity. As such, when a given node needs to communicate with the environment's infrastructure (e.g., when a node in an Azure environment needs to address the environment's infrastructure) then the node uses a facility-specific identity when making such environment-specific infrastructure calls (e.g., Azure API calls). As merely one specific example, a node might make API calls to inform the computing facility (e.g., Azure) that it is hosting a particular UVM at a particular IP address.

Additionally, a large set of facility-dependent steps are carried out when bringing up a computing cluster. Strictly as examples, some of the facility-dependent steps might include steps for forming and configuring a shared control plane (e.g., by allocating networking infrastructure), and/or for forming and configuring a shared storage pool (e.g., by allocating nodes with particularly-sized storage capabilities), and/or for configuring-in redundancy. Characteristics of the shared control plane, and characteristics of the shared storage pool serve to drive on-the-fly configuration of each heterogeneous virtualization system image.

In accordance with the foregoing, any of the aforementioned heterogeneous nodes may derive from any provider. Characteristics of the intended cluster influence the selection of nodes that are then on-the-fly configured to operate as a node of the intended cluster. Selection of nodes from a variety of providers can be accomplished using any known techniques. Strictly as an example, nodes ca be selected based on an inquiry into a cloud resource marketplace.

Details regarding general approaches to identifying and allocating heterogeneous nodes from a cloud resource marketplace are described in U.S. application Ser. No. 16/779, 047 titled "CLOUD RESOURCE MARKETPLACE," filed on Jan. 31, 2020, which is hereby incorporated by reference in its entirety.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or." That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts an environment 1A00 in which embodiments of the present disclosure can be implemented. The figure is being presented to illustrate how differently configured nodes situated in heterogeneous network environments can be selected, loaded with node-specific virtualization system software, and deployed so as to form a computing cluster.

As shown, a user issues cluster request 130. Responsive to the cluster request, nodes are selected from the shown heterogeneous node pool 101. A virtualization system image configurator 128 receives specifications 108 from node selector 114. Based on the specification of the nodes, and based on specification of the environments, the virtualization system image configurator produces corresponding node-specific virtualization system images 111, which are then used by cluster configurator 112 to load each of the selected nodes with its on-the-fly-configured virtualization system image.

The heterogeneous node pool 101 may comprise many different types of nodes. For example, the pool may comprise any types of computing equipment such as workstations, servers, racks of servers, graphics processors, etc., and each different instance of the different types of nodes may each have a corresponding node specification (e.g., node specification $105_1$, node specification $105_2$, . . . , etc.) and each different instance of the different types of nodes may each have a corresponding environment specification (e.g., environment specification $106_1$, environment specification $106_2$, . . . , etc.) corresponding to respective nodes (e.g., node1, node2, . . . , nodeN). In response to the foregoing cluster request, node selector 114 may retrieve any number of node specifications and/or any number of environment specifications from heterogeneous node pool 101 and may store each such specifications in a repository that holds candidate node information 117.

The virtualization system image configurator 128 (1) receives a set of candidate nodes 108 and (2) accesses a repository of virtualization system software 116. The system image configurator then attempts to configure a particular virtualization system image for each of the candidate nodes. Once the needed node-specific virtualization system images 111 have been formed, cluster configurator 112 delivers the virtualization system images to the nodes for which the virtualization system image was configured. To do so, cluster configurator 112 may wrap individual ones of the node-specific virtualization system images (e.g., image1, image2, . . . , imageN) into corresponding deployment packages 113. Each deployment package includes, among other facilities, a routine for self-installation that can be run by each target node. In some cases, a deployment package includes a credential and/or instructions for authentication of the source of the deployment package.

Once each of the deployment packages have been loaded onto their respective target nodes, the cluster is self-formed by execution of code that is included in the deployment package. Specifically, and as shown, each individual one of the images (e.g., image1, image2, . . . , imageN) contains an instance of cluster management service code 118. Each instance of the cluster management service code is configured specifically for its target node. Moreover, each instance of the cluster management service code is configured specifically for its target network environment such that when all of the target nodes execute their particular instance of the cluster management service code, a computing cluster is formed. There may be many different networking environments corresponding to the candidate nodes and some means of reconciling between these different networking environments is needed. Accordingly, the virtualization system image configurator 128 accesses a network environment matrix 119. Such a network environment matrix defines compatibilities between different a priori known networks. More specifically, such a network environment matrix defines capabilities and constraints that apply to the different a priori known networks. The cluster configurator 112 accesses the information in the network environment matrix 119, compares it with network requirements of the to-be-configured network environments, and uses the network environment matrix to reconcile conflicts. The reconciliations are recorded in the shown network environment reconciliations 129. Strictly as one example, a certain infrastructure provider might reserve certain addresses in a subnet for its own use or to provide network routing or other services to any of a variety of service hosts in that subnet. As another example, a certain infrastructure provider might disallow the sending of broadcast messages. Accordingly, parameters or flags in the virtualization system images that correspond to parameters or flags pertaining to that certain infrastructure provider might be set to convey the semantics of "BROADCAST='No'".

As each particular instance of the cluster management service code executes on each particular target node in its particular target networking environment, cluster-wide capabilities are configured. Strictly as examples, each particular instance of the cluster management service code will communicate with other nodes of the to-be-configured cluster for cluster-wide bring up of a common control plane and for cluster-wide bring-up of a shared storage pool (e.g., the contiguous address space storage pool 115, as shown). Once the cluster has self-assembled, and once the cluster has self-configured its common contiguous address space storage pool, it is in a condition for performing computing workloads.

Figure 1B:
FIG. 1B shows an example implementation of a node selector, according to an embodiment.
Figure 1B:
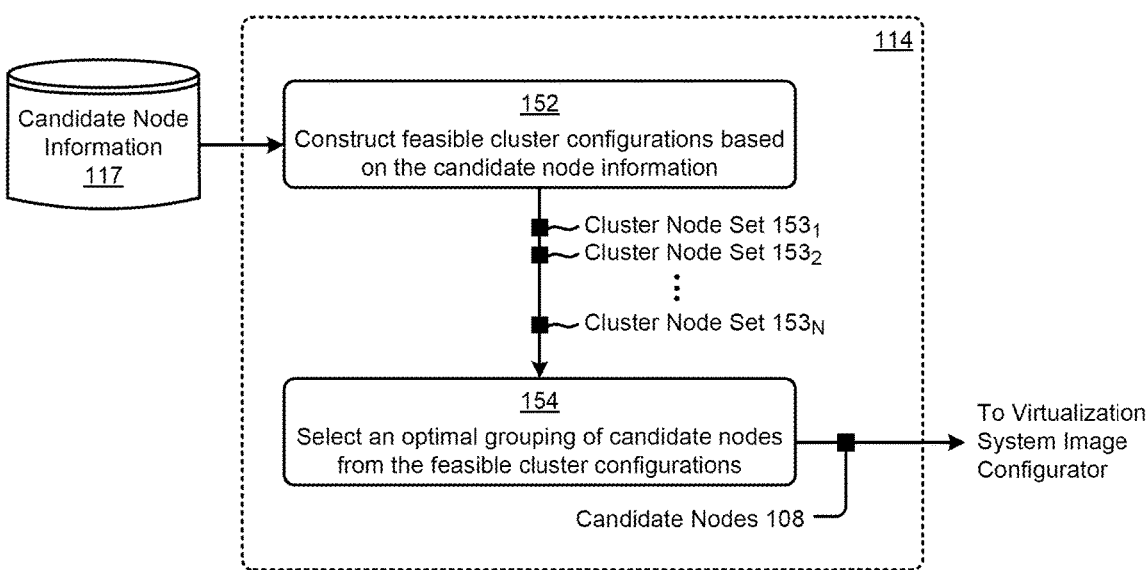

FIG. 1B shows an example implementation of a node selector 1B00. The figure is being presented to illustrate how information pertaining to a set of candidate nodes can be used to identify a group of candidate nodes that can be feasibly configured into a computing cluster. Specifically, and as shown, step 152 constructs feasible cluster configurations. Many different feasible cluster configurations are often possible. The number of feasible cluster configurations increases as the number of nodes and/or their environments increases. Moreover, the nodes that constitute any two feasible cluster configurations (e.g., cluster node set 153₁, cluster node set 153₂, . . . , cluster node set 153ₙ) may have substantially similar or identical node sets. Accordingly some means is needed to rank similar cluster configurations (step 154) so as to be able to select one or more optimal group of candidate nodes. In many cases, there are multiple similarly ranked cluster configurations. The candidate nodes 108 may include more nodes that are needed by the to-be-configured cluster. As such, downstream processes may select only certain ones of the candidate nodes. Selection may be based on intrinsic information pertaining to the node and its environment, or the selection may be based on how a particular node is compatible (or incompatible) with other candidate nodes.

Figure 2:
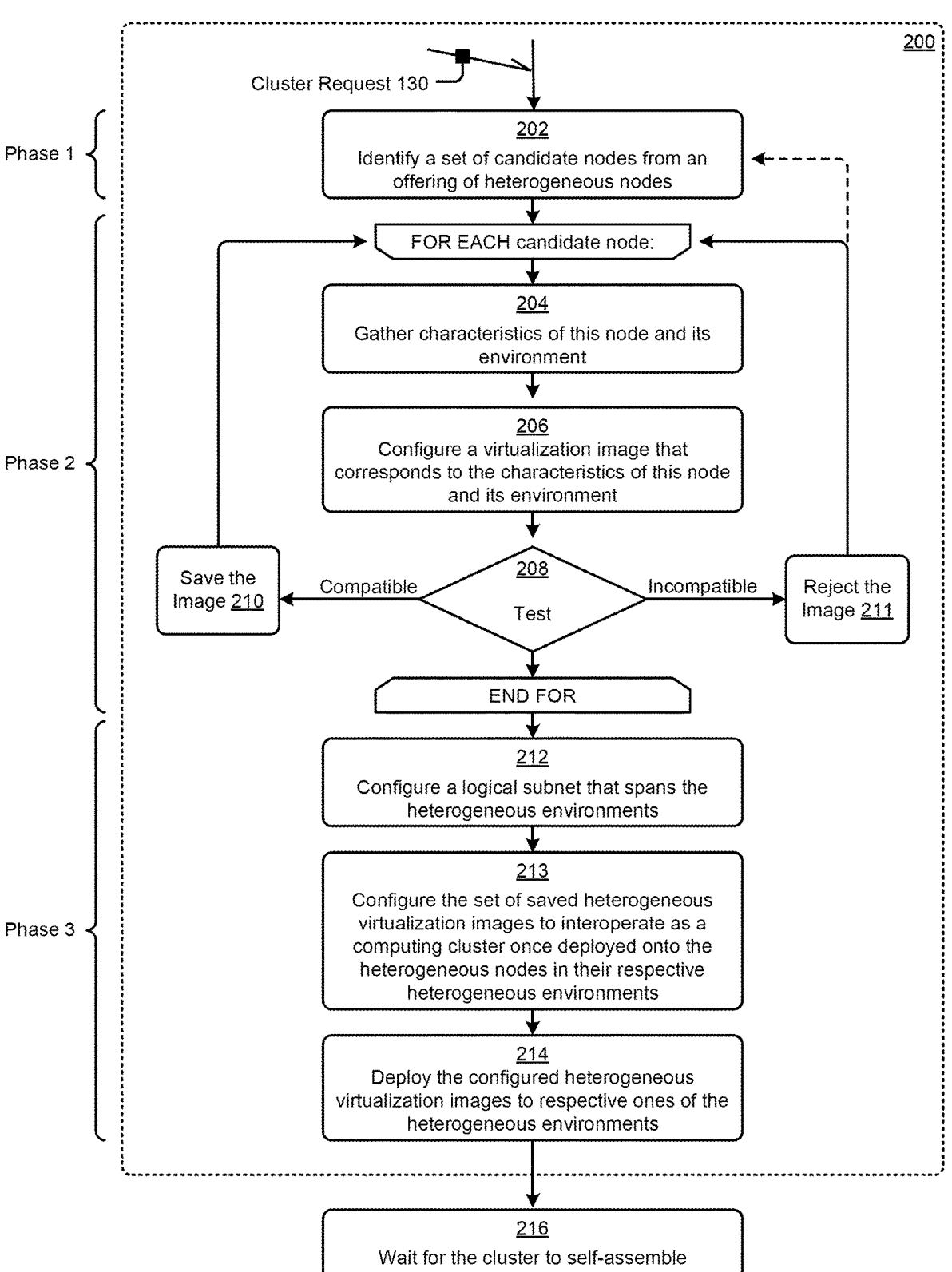
FIG. 2 presents an image deployment technique as used in systems for implementing a computing cluster on a heterogenous set of nodes, according to an embodiment.

An example flow of operations—from receipt of the user's cluster request through deployment of the set of node-specific virtualization system images—is shown and described as pertains to FIG. 2.

FIG. 2 presents an image deployment technique 200 as used in systems for implementing a computing cluster on a heterogenous set of nodes. As an option, one or more variations of image deployment technique 200 or any aspect thereof may be implemented in the context of the architecture and functionality of the embodiments described herein and/or in any in any environment.

The figure is being presented to illustrate how a computing cluster can self-assemble itself in response to the deployment of the set of node-specific virtualization system images to corresponding nodes that constitute the computing cluster. More particularly, the figure presents a flow of operations to implement the image deployment technique.

As shown, operation of the flow commences at step 202 upon receipt of cluster request 130. The cluster request includes sufficient information about the to-be-configured cluster such that candidate nodes can be drawn from a heterogeneous node pool. More specifically, the information about the to-be-configured cluster might include cluster specifications as to (1) the number of nodes to be included in the cluster, (2) a specified amount of storage needed for the storage pool (e.g., gigabytes of storage, IOPS requirements, etc.), (3) the need for any specialized hardware (e.g., graphics processing units, etc.), (4) the need for any particular networking capabilities (e.g., WAN bandwidth, etc.), (5) any preferences for software such as hypervisors, and (6) any preferred infrastructure providers (e.g., cloud provider 'A', cloud provider 'M', etc.).

Any known technique can be used to identify candidate nodes from the heterogeneous node pool. In some cases, an exchange or auction facility can be used, whereby any arbitrary infrastructure provider can offer a computing platform that can be taken over by a winning bidder. In some circumstances, the cluster may be formed of nodes that derive from different infrastructure providers.

When a set of candidate nodes have been identified, and when at least one combination of the candidate nodes has been deemed to be at least feasibly combinable into the requested cluster, step 204 and step 206 are carried out in a loop. At step 204, characteristics of a particular node are gathered (e.g., possibly using the foregoing node selector 114 and/or possibly drawing from the foregoing candidate node information 117). Step 206 attempts to configure a virtualization system image that comports with characteristics of the particular node. In some cases, possibly due to mis-sizing, and/or possibly due to incompatibilities between the node hardware and needed software, a virtualization system image for the particular node under consideration cannot be configured. Decision 208 serves to handle such cases.

Specifically, decision 208 is based on a test for compatibility between the candidate node and/or its environment, and the image. If the test indicates incompatibilities, then the "Incompatible" branch of decision 208 is taken and step 211 serves to reject this node from further consideration, and a different node will then be considered. On the other hand, if the test indicates compatibility, then the "Compatible" branch of decision 208 is taken and at step 210 the configured virtualization image is saved. In most cases, the foregoing step 202 identifies more nodes than are needed for assembly of the specified cluster. As such, step 211 can continue the loop by processing the next node. In certain other cases, such as if additional nodes or different types of nodes are needed in order to construct the specified cluster, step 211 can transfer processing control to step 202, where additional candidate nodes can be identified.

When a sufficient set of virtualization images have been saved, then the FOR EACH loop exits and processing proceeds to step 212. More specifically, when enough virtualization images have been configured for respective nodes, then the FOR EACH loop can exit.

At step 212, a logical subnet is defined. The nature of the logical subnet is determined at least in part by characteristics of the environments of corresponding nodes. More specifically, the logical subnet is defined such that all nodes of the to-be-configured cluster can communicate at least over the defined logical subnet. Still more specifically, the logical subnet is defined such that a plurality of nodes of the to-be-configured cluster may communicate over the subnet to implement a storage pool that is formed by logically assembling node-local storage devices into a shared storage pool having a contiguous address space that spans the nodes of the cluster.

At step 213, the set of saved virtualization images are configured such that when the set of nodes corresponding to the saved virtualization images execute, they are able to communicate with each other to self-assemble themselves into a computing cluster. Strictly as non-limiting examples, configuration of the saved virtualization images might include: (1) parameterized assignment of node-specific identities, (2) parameterized assignment of an initial leader, (3) setting of initial environment-specific parameters, (4) setting of parameters pertaining to establishment of an initial networking configuration in the environment, (5) setting of parameters pertaining to establishment of an initial networking configuration for communications between the various environments, (6) parameterization for initial sharding of the shared storage pool, (7) authorization and authentication parameterization for the node to make automatic adjustments to the computing facility environment as needed to perform desired workloads, (8) parameterization for accepting commands or other messages from on-cluster or external control systems and (9) setting of other parameters. When the image parameterization of step 212 has been carried out for all of the images for all of the nodes that constitute the requested cluster, the parameterized images can be deployed to their corresponding nodes (step 214). In some cases, at least some of the nodes are given an environment-specific node identity. Strictly as one example, a node might be given a name that is specific to a particular tenant of a cloud provider.

Once some or all of the nodes have been started (e.g., in their respective environments) the cluster will begin to self-assemble by operation of the individual nodes in cooperation with the other nodes. In due course, the cluster will complete its self-assembly and be in a condition to run a workload. Step 216 serves to wait until the cluster has deemed itself to be ready for running a workload. Upon readiness (e.g., determined by a ready signal) of the self-assembled cluster to process a workload, a workload can be loaded onto the cluster.

Figure 3:
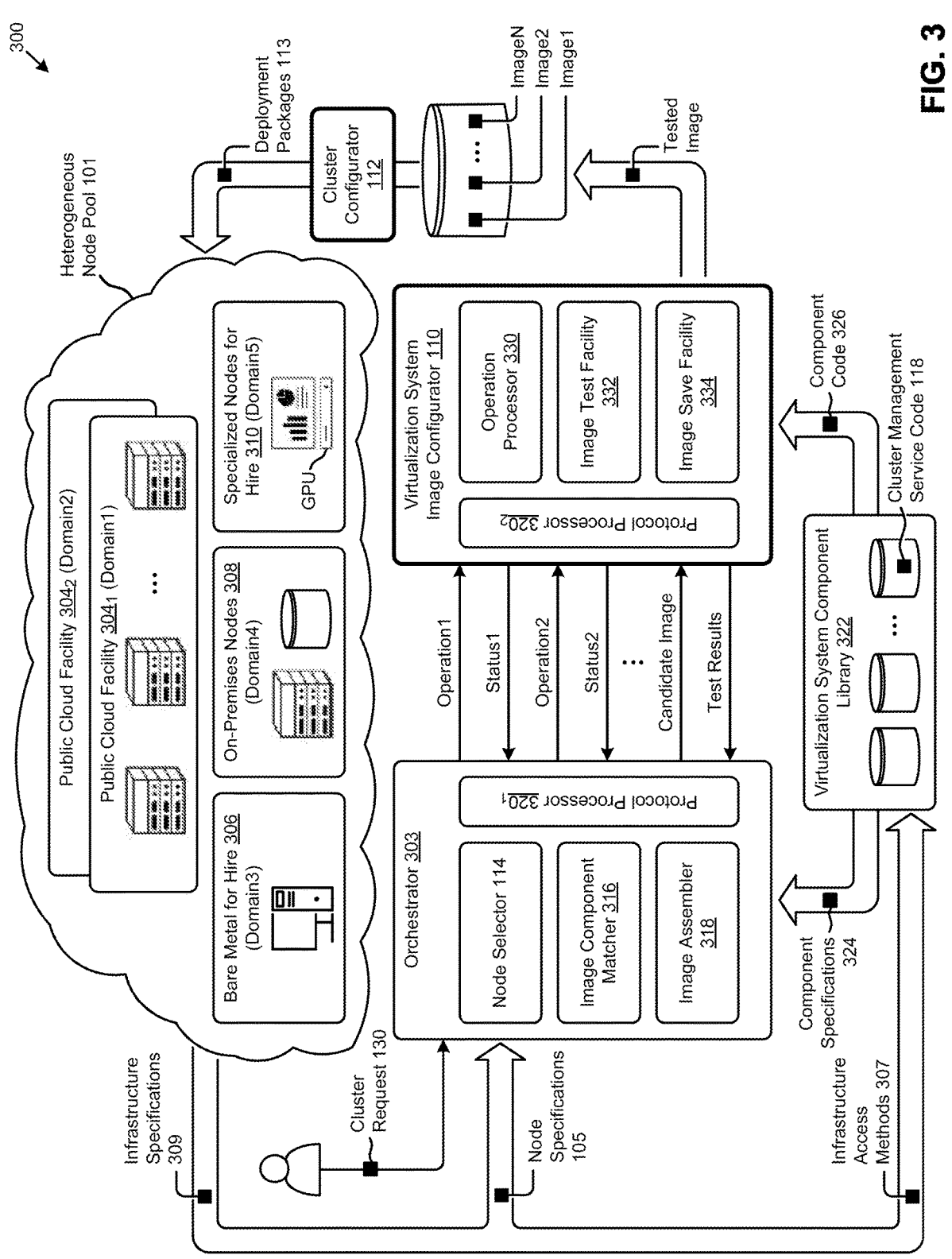
FIG. 3 shows a system for configuring virtualization system images to implement a computing cluster on a heterogenous set of nodes, according to an embodiment.

FIG. 3 shows a system 300 for configuring virtualization system images to implement a computing cluster onto a heterogenous set of nodes. As an option, one or more variations of system 300 or any aspect thereof may be implemented in the context of the architecture and functionality of the embodiments described herein and/or in any in any environment.

The figure depicts one possible implementation of the image deployment technique of FIG. 2. As shown, the implementation includes an orchestrator 303 that, in response to receipt of cluster request 130 carries out a protocol with a virtualization system image configurator 110. In this embodiment, the orchestrator is responsible for matching image components to candidate nodes so as to construct a compatible virtualization system image for a particular candidate node. Specifically, image component matcher 316 compares node specifications 105 and infrastructure specifications 309 to component specifications 324 in order to resolve to a match. In this implementation, the component specifications of corresponding component code 326 are drawn from virtualization system component library 322. In addition to component code 326, the virtualization system component library might also include specifications of infrastructure access methods 307. Such infrastructure access methods might correspond to a preferred infrastructure provider as given in the cluster request. Inclusion of code that calls such infrastructure access methods into a virtualization system image supports in-situ calls to facility-specific APIs.

When a match between a node specification and a needed component specification has been found, then orchestrator 303 can initiate a protocol between itself and virtualization system image configurator 110. As shown, the orchestrator 303 and the virtualization system image configurator 110 each rely on a protocol processor (protocol processor $320_1$, protocol processor $320_2$) to send/receive operation requests and returned statuses (e.g., status1, status2). The operations requests may refer to idempotent operations. Moreover, the protocol processor may be configured to handle state transitions and retries as idempotent operations are successfully completed or as idempotent operations fail.

Strictly as an example, a first operation (i.e., shown as operation1) might be a request to the virtualization system image configurator to compile a particular item of component code using environmental characteristics that comport with the particular matched node. As another example, a second operation (i.e., shown as operation2) might be a request for the virtualization system image configurator to add a calling routine pertaining to one of the infrastructure access methods 307. As yet another example, a third or Nth operation might be a request for the virtualization system image configurator to include parameterized cluster management service code 118 into the image under construction (i.e., candidate image). As operations are successfully performed (e.g., by operation processor 330), and as statuses are returned from performance of the operations, the image assembler 318 can continuously assemble the target virtualization system image.

At some point, the image under construction is deemed to be ready for compatibility testing. At such a time, the orchestrator can send a candidate image to the virtualization system image configurator with instructions to perform the testing. Compatibility testing can be performed in image test facility 332. Status of the testing (e.g., the shown test results) is sent back to the orchestrator and, if the testing of the candidate image deems an image to be compatible with its intended node, then an image save facility 334 of the virtualization system image configurator can save the tested image in a repository that at least temporarily holds the tested images together with an indication of the image's correspondence to a particular target node.

When all of the testing has been carried out over all of the images for all of the nodes that constitute the requested cluster, the images can be deployed to their corresponding node. Cluster configurator 112 accesses the images (e.g., image1, image2, . . . , imageN) includes in the images any needed routines for self-installation and wraps the assemblies into deployment packages 113. The deployment packages comprising the parameterized and tested images can be deployed to their corresponding nodes and the cluster will begin to self-assemble by operation of the individual nodes in cooperation with the other nodes.

As indicated heretofore, the nodes of the to-be-configured cluster will begin to self-assemble by operation of the individual nodes in cooperation with the other nodes. However, it often happens that the different heterogeneous nodes are situated in different networking environments. For example, a first set of nodes of the cluster might be situated in a first domain (e.g., domain1) of a first public cloud facility (e.g., public cloud facility 304₁), whereas a second set of nodes of the cluster might be situated in a second domain (e.g., domain2) of a second public cloud facility (e.g., public cloud facility 304₂), and whereas a third set of nodes of the cluster might be situated in a third domain (e.g., domain3) corresponding to some bare metal provider (e.g., bare metal for hire 306), and so on. In fact, in some cases, one or more nodes of the cluster might be situated in yet additional domains (e.g., domain4, domain5) that might correspond to on-premises nodes 308 and/or that might correspond to specialized nodes for hire 310. In such situations, the procedure for deployment of the images considers the networking environment of the target heterogeneous platforms such that the nodes of the to-be-configured cluster can interoperate with each other by communicating over a subnet. An example of such considerations during deployment are shown and described as pertains to FIG. 4.

Figure 4:
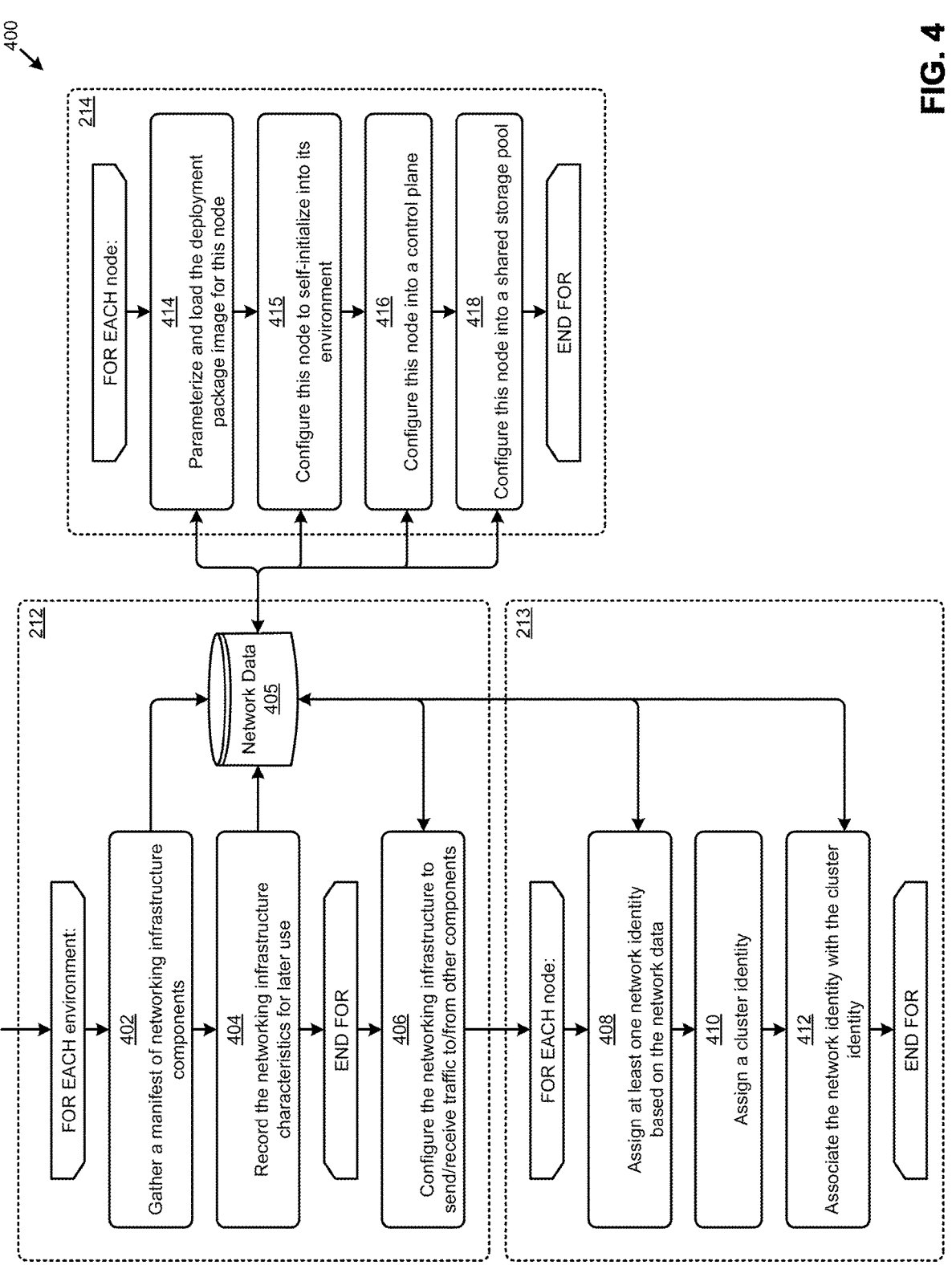
FIG. 4 presents a heterogeneous platform image deployment technique as used in systems for implementing a computing cluster on a heterogenous set of nodes, according to an embodiment.

FIG. 4 presents a heterogeneous platform image deployment technique 400 as used in systems for implementing a computing cluster on a heterogenous set of nodes. As an option, one or more variations of heterogeneous platform image deployment technique 400 or any aspect thereof may be implemented in the context of the architecture and functionality of the embodiments described herein and/or in any in any environment.

When deploying the heterogeneous images to heterogeneous platforms, it happens that the networking environments of the target heterogeneous platforms may be very different. Mechanisms for initial access to a node (e.g., via a port at an IP address or via a facility-specific API) may be specified by the resource provider. However, when configuring heterogeneous nodes to interoperate as a cluster, some means for secure—and possibly environment-specific communications between nodes—needs to be provided. Moreover, each heterogeneous node might be situated in respective and possibly different network environments. For example, a first node might be situated in domain1, a second node might be situated in domain2, an Nth node might be situated in yet another domain, and so on. Accordingly, each environment needs to be considered both individually and as a whole.

Step 402 and step 404 are performed in a loop over each environment. For each environment, the node or nodes that are situated in that environment are considered, and any needed networking infrastructure components are allocated.

Characteristics of the components (e.g., type of networking component, MAC addresses, IP addresses, ports, etc.) are stored in network data 405. This is performed for each environment in advance of considering the node or nodes that are to be brought-up (i.e., as cluster nodes sharing a contiguous address space storage pool) within that network environment.

Once the needed networking infrastructure components have been allocated, they can be configured for their intended operation (step 406). Strictly as one example, the needed networking infrastructure components might be configured to operate on the same subnet.

As used herein, a "subnet" is a logical grouping of hosts wherein each host may communicate directly with any other host in the subnet. "Directly" in this case means that a host need not be aware of, or explicitly direct messages to, an intermediary address (such as the address of a router) for messages sent by the host to reach their intended destination. A subnet may be identified by a range of addresses. For example, Internet Protocol version 4 (IPv4) identifies a subnet by means of the first address in the subnet (or "network address") and a "network mask", which specifies the range of available addresses in the subnet (with the first and last addresses reserved as the network address and broadcast address, respectively). One example of an IPv4 subnet is "10.2.3.0/24", which identifies a subnet with network address 10.2.3.0 and network mask of 24 bits, meaning the subnet covers the IP addresses 10.2.3.0 through 10.2.3.255 (with 10.2.3.255 being the broadcast address). As used herein, a "host" is any node, computer, router, or other device attached to a subnet, where each device may have one or more network identities or "addresses" (such as IP addresses) which the device uses to send and receive messages.

There may be any number of nodes that are to be brought up (i.e., as cluster nodes) within a particular network environment. Accordingly, and as shown in the FIG. 4, each node of a to-be-configured cluster is considered individually in a loop. Strictly as one possible implementation, step 408 assigns a network identity (e.g., an IP address) to the node. Additionally, a worldwide unique cluster identity (e.g., a UUID) is also assigned to the node (step 410) and that node's network identity is associated with the unique cluster identity (step 412). As such, when all of the nodes that are intended for the to-be-configured cluster perform their respective initialization procedures, they can each know (1) what cluster it has been assigned into, and (2) what other nodes are in the same cluster.

Having an assigned node identity and assigned membership into a uniquely identified cluster, the deployment package for this node can be parameterized (step 414) with the node identity and cluster identity, and then loaded into the target node (for example, by means of a secure file-transfer protocol such as HTTPS or SFTP, in combination with a package installation tool such as "RPM" or "dpkg", or by means of remote operating system install capabilities such as those provided by "IPMI"). The deployment package may include one or more of an operating system or hypervisor installer, environment-specific software components, and/or the aforementioned configuration/parameterization. When the deployment package for this node is loaded, it begins to execute so as to self-initialize this node into its environment (step 415). Strictly as one example, a deployment package might include instructions to self-install a host operating system or hypervisor onto the target node prior to loading components of the virtualization system onto the target node. In some embodiments, step 415 is configured for sending instructions to two or more cloud environments, such that operational elements in the cloud environments can process the instructions and configure respective portions of a common subnet that spans the two or more cloud environments.

When the deployment packages for all nodes that make up the to-be-configured cluster have been loaded into their respective target nodes, each node can be responsive to instructions that are included in its deployment package and/or each node can be responsive to instructions it receives over the network from other members of the cluster, such as when the other members of the cluster perform their respective initialization procedures. The acts of performing the foregoing instructions by one or more of the members of the cluster serve to (1) configure a control plane (step 416), and (2) to configure a shared storage pool (step 418). Strictly as one example of configuring a shared storage pool, it can happen that the nodes, and more specifically the node-local storage of the nodes of the cluster may have widely-varying capabilities in terms of I/O performance and/or storage capacity. Accordingly, when configuring the contiguous address space storage pool, a relatively less capable node and/or its corresponding node-local storage might be assigned a very small portion of the contiguous address space and/or such a relatively less capable node and/or its corresponding node-local storage might be assigned a storage pool address range that is relatively less likely to be the source or target of storage pool I/Os. As one possible such configuration, a node that is selected into the cluster due to its graphics processors and its ability to host graphics-centric workloads, might be accorded only a very small portion of the address space of the contiguous address space storage pool.

Conversely, when configuring the contiguous address space storage pool, a relatively more capable node and/or its corresponding node-local storage might be assigned a very large portion of the contiguous address space and/or such a relatively more capable node and/or its corresponding node-local storage might be assigned a storage pool address range that is deemed to be relatively more likely to be the source or target of storage pool I/Os.

As further examples of the foregoing initialization procedures, a control plane might be configured to facilitate communication by all of the cluster nodes to a different node that is outside of the subject cluster. In some cases, the different node that is outside of the subject cluster is a node that is outside of the heterogeneous node pool.

In some cases, the network environment into which a cluster node is to be deployed is owned by a public cloud provider. In the context of public clouds, each subscriber to the cloud services is often assigned a tenant-specific identity. The tenant-specific identity is hardened with credentials or other trust mechanisms such that the workings of one tenant is not visible to any other tenant. For providing a secure services by a cluster that is at least partially implemented by nodes that are in a public cloud, physical infrastructure (e.g., physical networking infrastructure) needs to be allocated to provide isolated infrastructure to each tenant. This includes physical infrastructure entities such as specialized nodes (e.g., as a hyperconverged infrastructure system (HCI) or compute only CO nodes), IP addresses from a pool, predefined VLANs, VxLANs as well as other allocatable entities such as, overlay network components, underlay network components, management plane APIs, etc. In some cases, such infrastructure needs to be provisioned with trust mechanisms to be able to honor per-tenant security policies. This provisioning might be applied iteratively over a wide variety of services that might be availed by a computing cluster. Strictly as examples, services that rely on infrastructure that is provisioned with trust mechanisms include disaster recovery, cluster monitoring services, infrastructure monitoring services, etc.

Various techniques can be employed to bring up infrastructure that is provisioned with trust mechanisms. One such technique involves first provisioning an isolated network for a particular tenant (e.g., using VxLAN overlay techniques), and then provisioning other resources from within this isolated network.

Figure 5A:
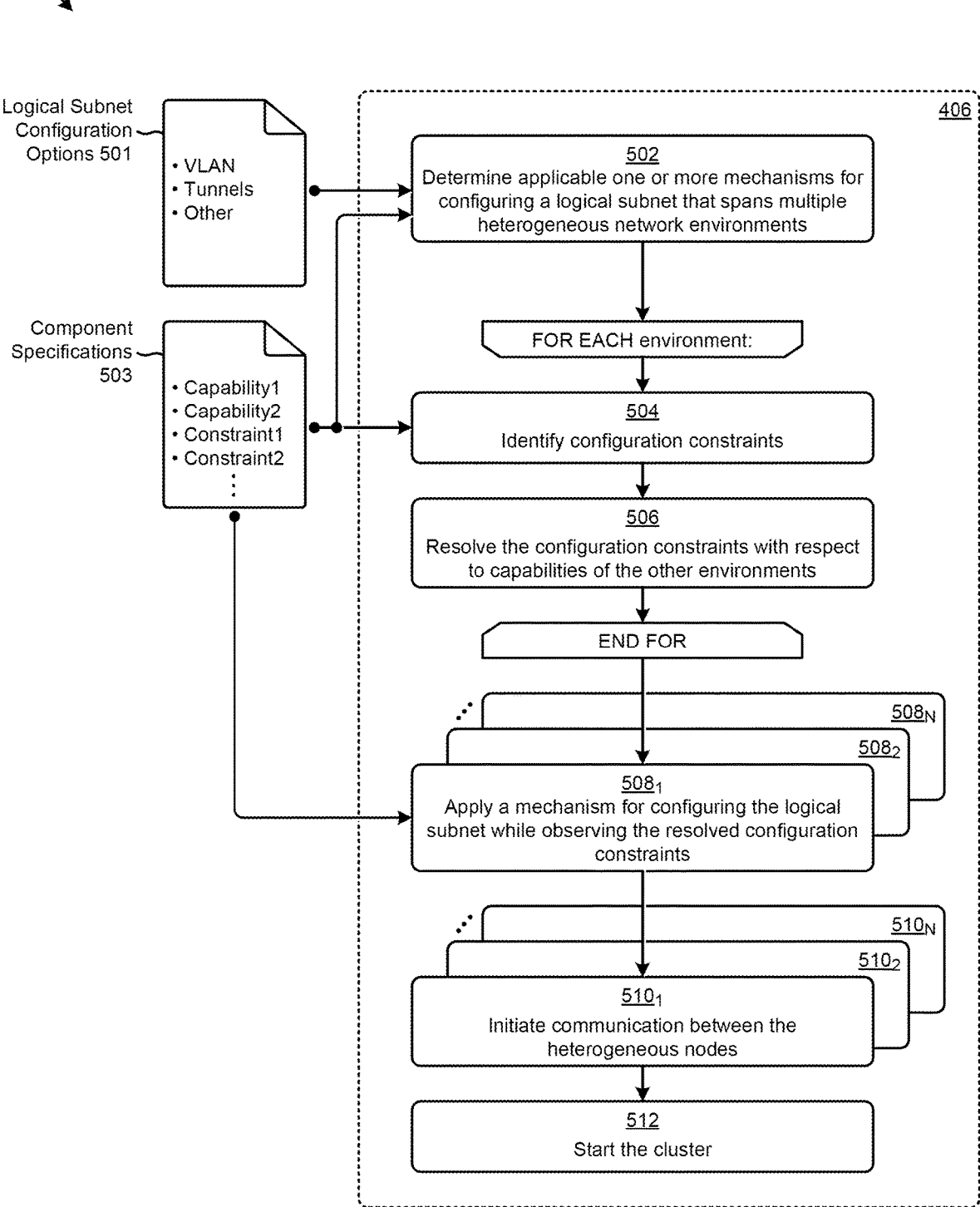
FIG. 5A presents a networking infrastructure initialization technique as used in systems for implementing a computing cluster on a heterogenous set of nodes, according to an embodiment.

FIG. 5A presents a networking infrastructure initialization technique 5A00 as used in systems for implementing a computing cluster on a heterogenous set of nodes. As an option, one or more variations of secure networking infrastructure allocation technique 5A00 or any aspect thereof may be implemented in the context of the architecture and functionality of the embodiments described herein and/or in any in any environment.

The figure is being presented to illustrate one technique for provisioning networking equipment when implementing a computing cluster on a heterogenous set of nodes. The particular technique involves multiple steps, specifically: (1) form a private VxLAN as an overlay; (2) securely and from within the private VxLAN, provision networking equipment to form a tenant-specific secure underlay; and (3) initialize the underlay.

The need to perform the aforementioned multiple steps arises from a motivation to operate virtual machines on the heterogenous computing cluster without an overlay network. This is because an overlay network introduces unwanted latencies in nearly all network paths. Rather, what is desired is to operate virtual machines on the heterogenous computing cluster on an underlay network that eliminates network address translation for nearly all network paths to and from the virtual machines.

This need to eliminate latencies involved in an overlay network becomes acute in many cluster use cases. For example, a cloud-based cluster might be created for providing a secure disaster recovery service in the cloud). In this and many other public cloud use cases, specific types of physical networking infrastructure needs to be allocated on a tenant-specific basis (e.g., to provide such physical networking infrastructure in a secure manner and/or to provide isolated physical networking infrastructure to each tenant).

In addition to the aforementioned specific types of physical networking infrastructure, tenant-specific allocation of a cloud provider's infrastructure might include allocation of human-computer interface facilities and/or compute-only nodes, and/or facility-specific IP addresses, and/or VLANs, network tunnels (e.g., VxLANs), management planes, etc. Moreover, in some cases, the allocated infrastructure needs to be provisioned with per-tenant identities such that services can trust (e.g., authenticate) interactions as belonging to a known (e.g., authenticatable) tenant. Still further, allocated infrastructure is configured to be associated with a suite of monitoring services that monitor the computing cluster as a whole and/or that monitor components that constitute the cluster. Such monitoring is carried out throughout the lifecycle of the computing cluster.

FIG. 5A shows one possible implementation for allocating and configuring networking infrastructure when implementing a computing cluster on a heterogenous set of nodes. The shown implementation commences at step 502 where a set of physical infrastructure components needed for secure, tenant-specific computing is identified. More specifically, various processing within step 502 may consider any components drawn from the component specifications 503 and or any of a plurality of logical subnet configurations options 501 so as to select at least one transit mechanism that implements a common subnet over which all of the nodes of the to-be-configured cluster storage pool can communicate. These identified components can be determined based on many factors, including the nature of a particular application (e.g., disaster recovery) and/or characteristics of a particular environment, etc. Indeed, the performance of step 502 may take place one time for each environment involved in the to-be-configured cluster.

For each component, and in each different environment, step 504 serves to identify environment-specific constraints (e.g., network connectivity constraints). Strictly as one example, an environment-specific identity may be provided by a cloud provider (e.g., as a tenant-specific identity). In other situations there are other constraints and/or capabilities that are to be observed, and in some cases, there may be intra- or inter-environment conflicts that are to be resolved. Step 506 serves to resolve such environment-specific constraints with respect to intra- or inter-environment capabilities.

One example constraint involves trust mechanisms. Specifically, it might be a requirement (e.g., in a public cloud setting) that trust must be established with respect to a particular environment-specific identity. Trust can be established by any known technique, possibly involving a certificate for authentication, and/or possibly involving a self-signed certificate for authentication, and/or possibly involving one or more other types of credentials. Once there is an environment-specific identity and a mechanism for authenticating the environment-specific identity, the component is logically attached to a trusted monitoring service. Such a monitoring service can monitor hardware health, and/or can monitor cluster performance (e.g. performance of the storage pool). In some deployments a trusted monitoring service includes security monitoring so as to identify and report suspicious behavior over the storage pool.

When the components that were identified in step 502 have been processes in this loop (e.g., through steps 504, and step 506), the components are in a condition to be provisioned into a common subnet. The mechanism or mechanisms that were selected in step 502 are now applied (e.g., step 508₁, step 508₂, step 508ₙ). More particularly, when there are multiple different mechanisms involved, each mechanism might be applied to corresponding components, and/or applied to configuration of parameters or code of the to-be-configured node.

Since there are multiple heterogeneous environments corresponding to the heterogeneous nodes, it might be that there are different techniques involved for configuring a given node to begin participating with other nodes of the cluster that form the storage pool. For example, the computing facility providing the node may require all addresses used by the node to be registered with the facility prior to their use. Or the facility may even require the node to use only those addresses assigned by the facility (that is, the node is given no choice about which addresses to use). This is shown in FIG. 5A as step 510₁, step 510₂, step 510ₙ.

Once all of the nodes have been initialized and kick-started such that each node can communicate with each other ones of the nodes of the cluster that form the storage pool, the cluster can be started (step 512), the storage pool can be initialized, and a workload can be loaded onto the cluster.

FIG. 5B presents an alternative networking infrastructure initialization technique 5B00 as used in systems for implementing a computing cluster on a heterogenous set of nodes. In this embodiment, physical infrastructure components for secure tenant-specific networking (e.g., in a public cloud setting) are identified and allocated as needed for the to-be-configured cluster (step 552). More specifically, for each component identified in step 552, the identified component is associated with a tenant-specific identity (step 554), trust is established, possibly using a credential (step 556), and the component is associated with a monitoring service (step 558). The monitoring service is able to detect any sort of "outage" that may happen through or due to a particular component.

In situations involving the foregoing tenant-specific components, and specifically to facilitate initialization of a given node to begin communicating with other nodes of the cluster, a secure tenant-specific VxLAN overlay might be provisioned (step 560). Using the secure, tenant-specific VxLAN overlay, additional allocation steps are carried out. Specifically, tenant-specific components (e.g., tenant-specific IP addresses drawn from a pool) may be applied to a node or nodes (step 562), a cluster management plane might be defined (step 564), and nodes might be configured to access cloud-provided services provided by the cloud vendor (step 566).

Having thusly configured the nodes in this environment, the configured nodes can be brought up to communicate with other nodes (in other environments) of the to-be-configured cluster (step 568).

In some cases, an orchestrator service is used to provision infrastructure as per the foregoing and, in some cases, the orchestrator service carries out the initial provisioning of an isolated network for a tenant using VxLAN overlay techniques, and thereafter provisions further hardware resources within the isolated network. An example implementation of use of an orchestrator to provision based on pooled resources is shown and described as pertains to FIG. 6

Figure 6:
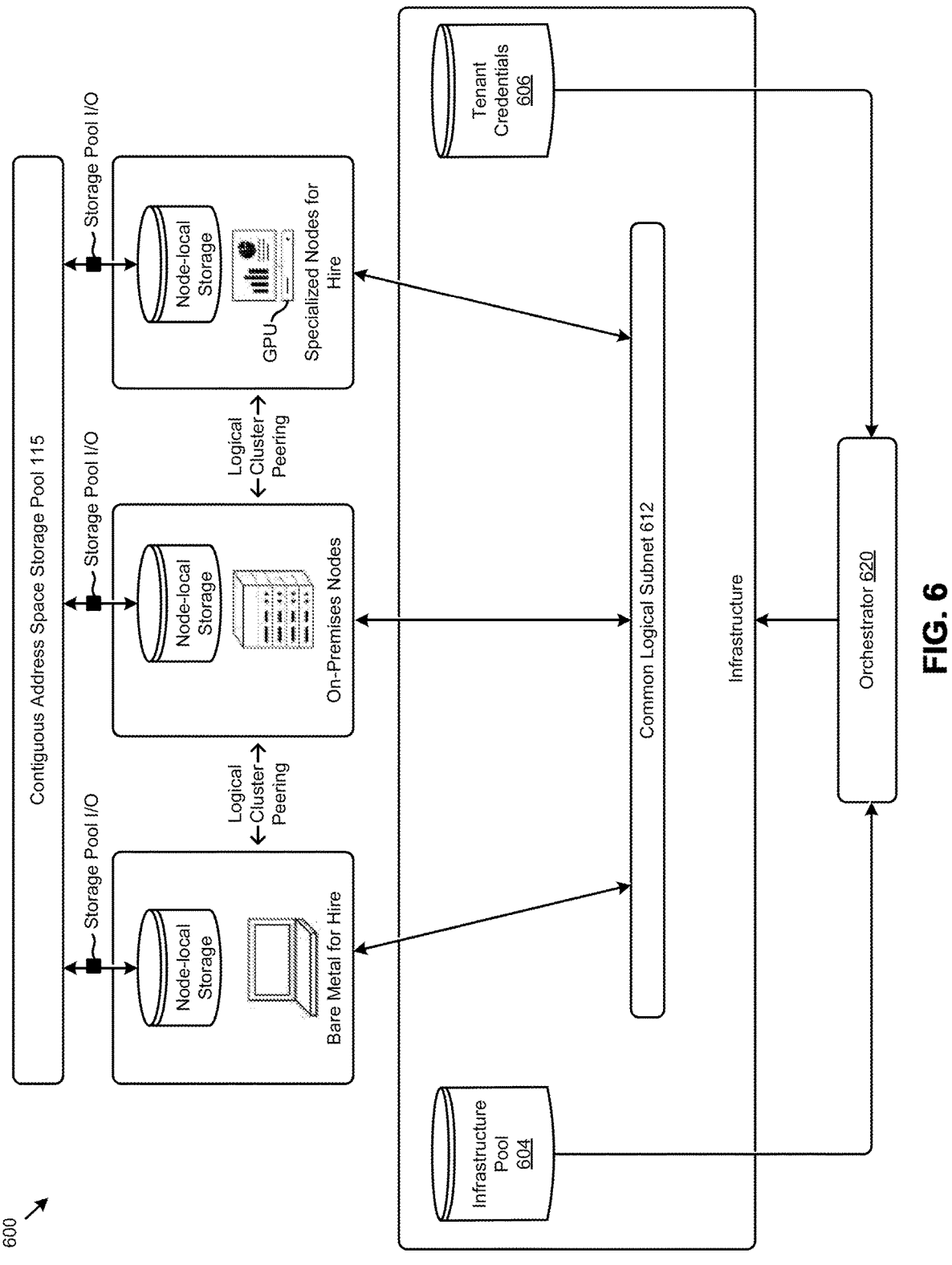
FIG. 6 depicts a system for configuring a contiguous address space storage pool formed of heterogeneous nodes that communicate over a common subnet, according to an embodiment.

FIG. 6 depicts a system 600 for configuring a contiguous address space storage pool formed of heterogeneous nodes that communicate over a common subnet. As shown, an orchestrator service 620 accesses an infrastructure pool 604. The infrastructure pool comprises allocatable networking components as well as allocatable addresses within a subnet, possibly drawn from an address pool (e.g., where the addresses are non-overlapping). The orchestrator service may access tenant credentials 606 to configure per-tenant firewalls (e.g., to secure the cluster). The per-tenant identity is provisioned into clusters as well as into the management plane of a particular tenant. The per-tenant identity is used when communicating with services in the cloud environment. The orchestrator itself may use the per-tenant identity when configuring the monitoring platform to enable continuous monitoring. The common subnet 612 serves for bootstrapping one or more data paths for use by tenant virtual machines. Moreover, common subnet 612 serves for bootstrapping heterogeneous node-local storage devices of the heterogeneous nodes into the contiguous address space storage pool 115. Still further, in some embodiments, the common subnet 612 serves as a communication path over which the full address range of the storage pool is made network accessible to multiple computing entities from multiple cloud environments. As such, the common subnet 612 implements an inter-cloud communication fabric such that a single computing cluster is formed of a plurality of computing nodes that interoperate over the common inter-cloud communication fabric.

A disaster recovery regime that provides for high-availability of the data of the contiguous address space storage pool can be configured using the heterogeneous nodes, possibly in combination with other nodes that are outside of the logical boundary of the computing cluster. For intra-cluster initialization of the disaster recovery regime, the common subnet 612 is used.

Details regarding approaches to configuring a disaster recovery regime are described in U.S. application Ser. No. 16/200,482 titled "USING SNAPSHOTS TO ESTABLISH OPERABLE PORTIONS OF COMPUTING ENTITIES ON SECONDARY SITES FOR USE ON THE SECONDARY SITES BEFORE THE COMPUTING ENTITY IS FULLY TRANSFERRED," filed on Nov. 26, 2018, which is hereby incorporated by reference in its entirety.

System Architecture Overview

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 7A, FIG. 7B, FIG. 7C, and FIG. 7D.

Figure 7A:
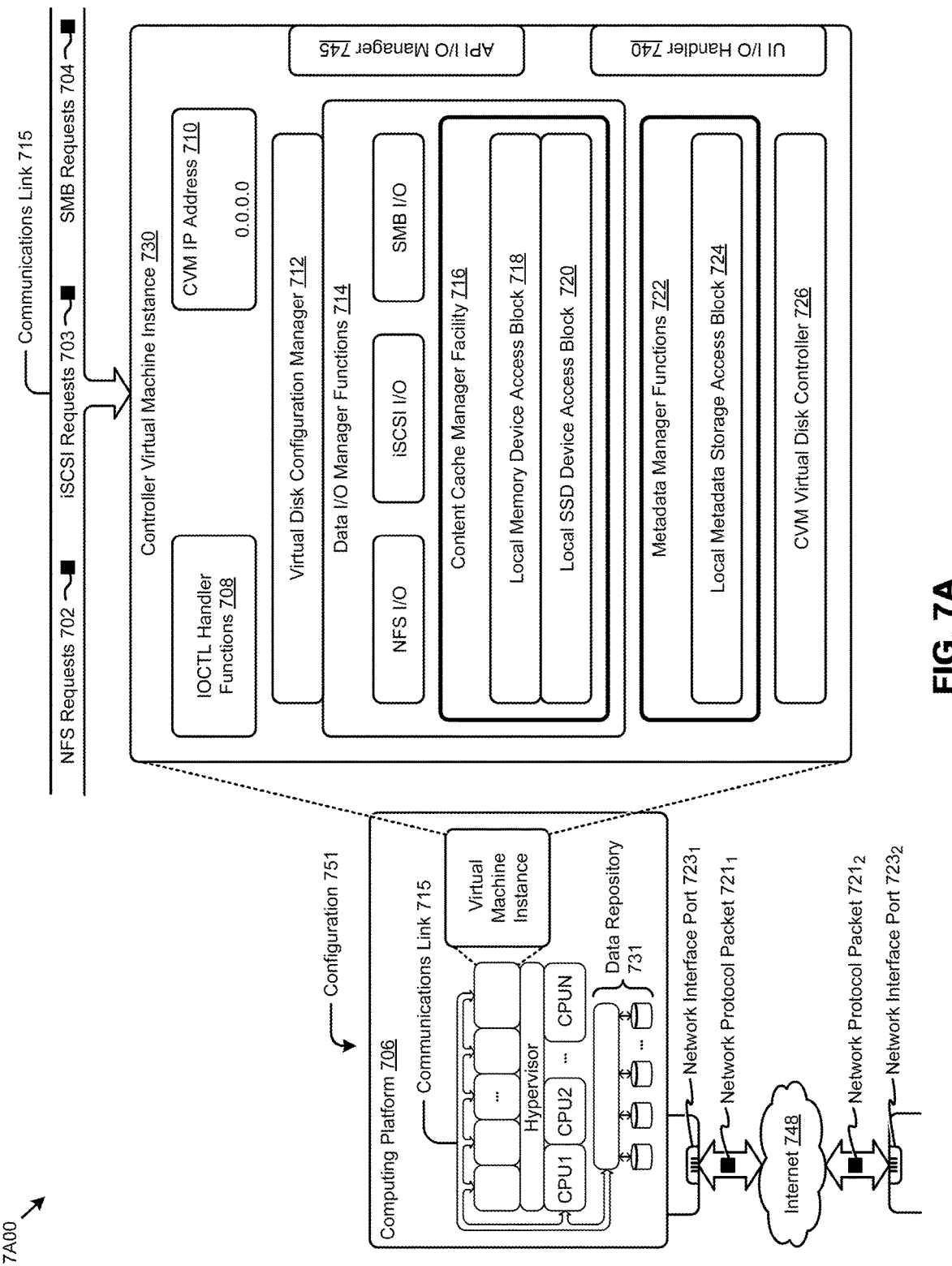
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block 110 storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to configuring virtualization system images to implement a computing cluster on a heterogenous set of nodes. In some embodiments, a module may include one or more state machines and/or combinational logic used to implement or facilitate the operational and/or performance characteristics pertaining to configuring virtualization system images to implement a computing cluster on a heterogenous set of nodes.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of configuring virtualization system images to implement a computing cluster on a heterogenous set of nodes). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to configuring virtualization system images to implement a computing cluster on a heterogenous set of nodes, and/or for improving the way data is manipulated when performing computerized operations pertaining to performing on-the-fly configuration of different virtualization system images to deploy onto heterogeneous nodes that comprise the computing cluster.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 7B:
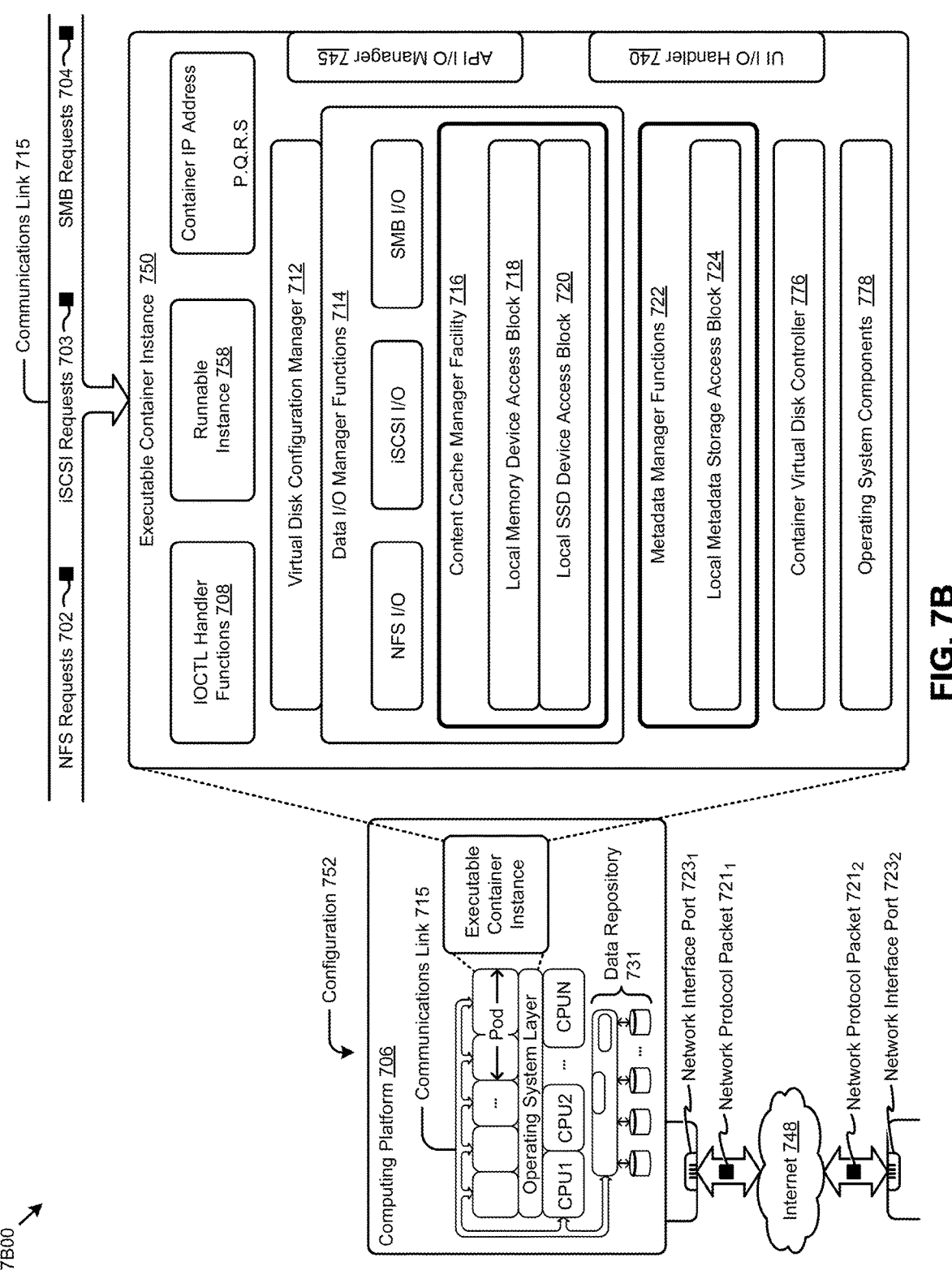

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S," as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a," etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
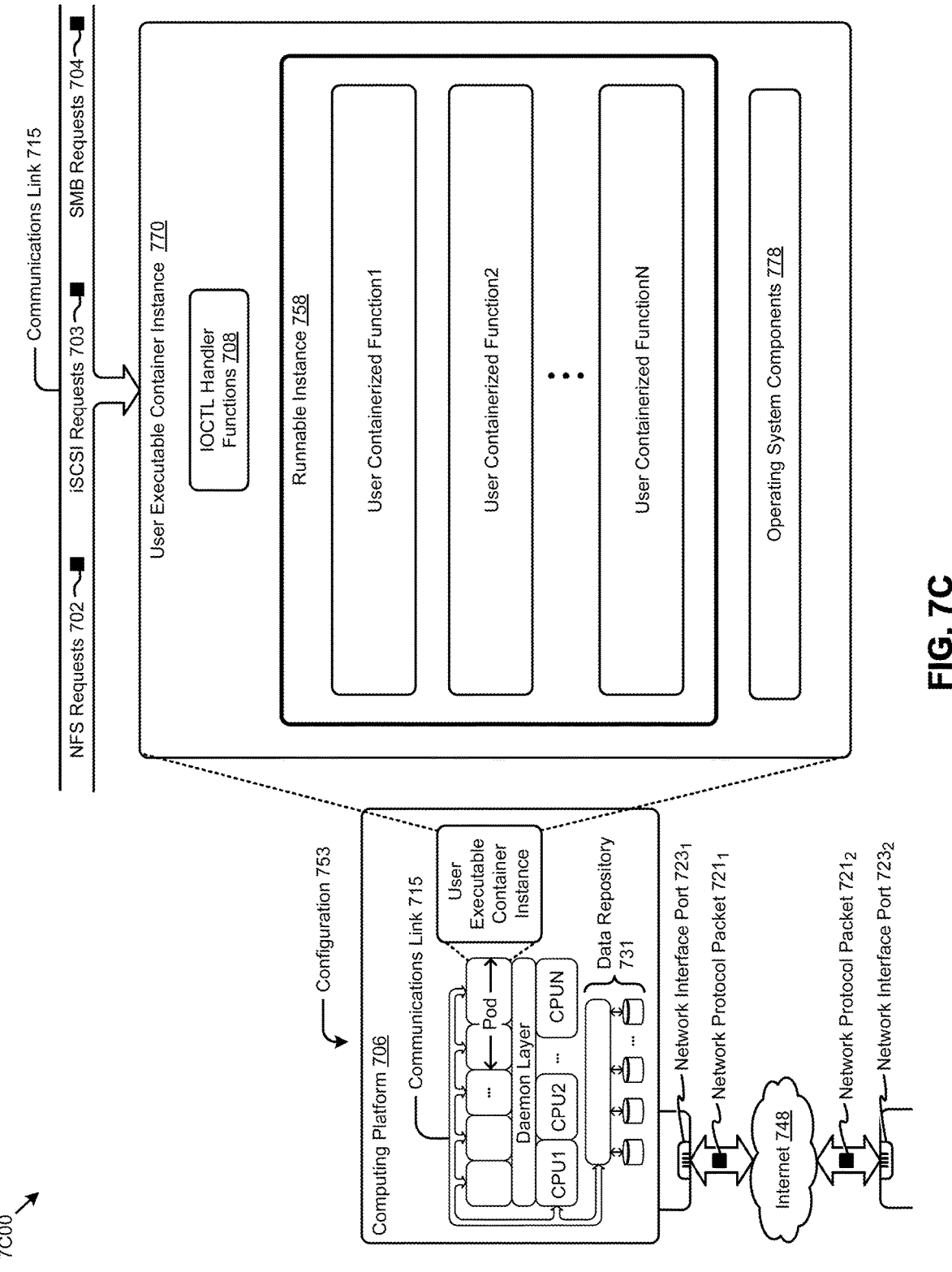

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM," or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
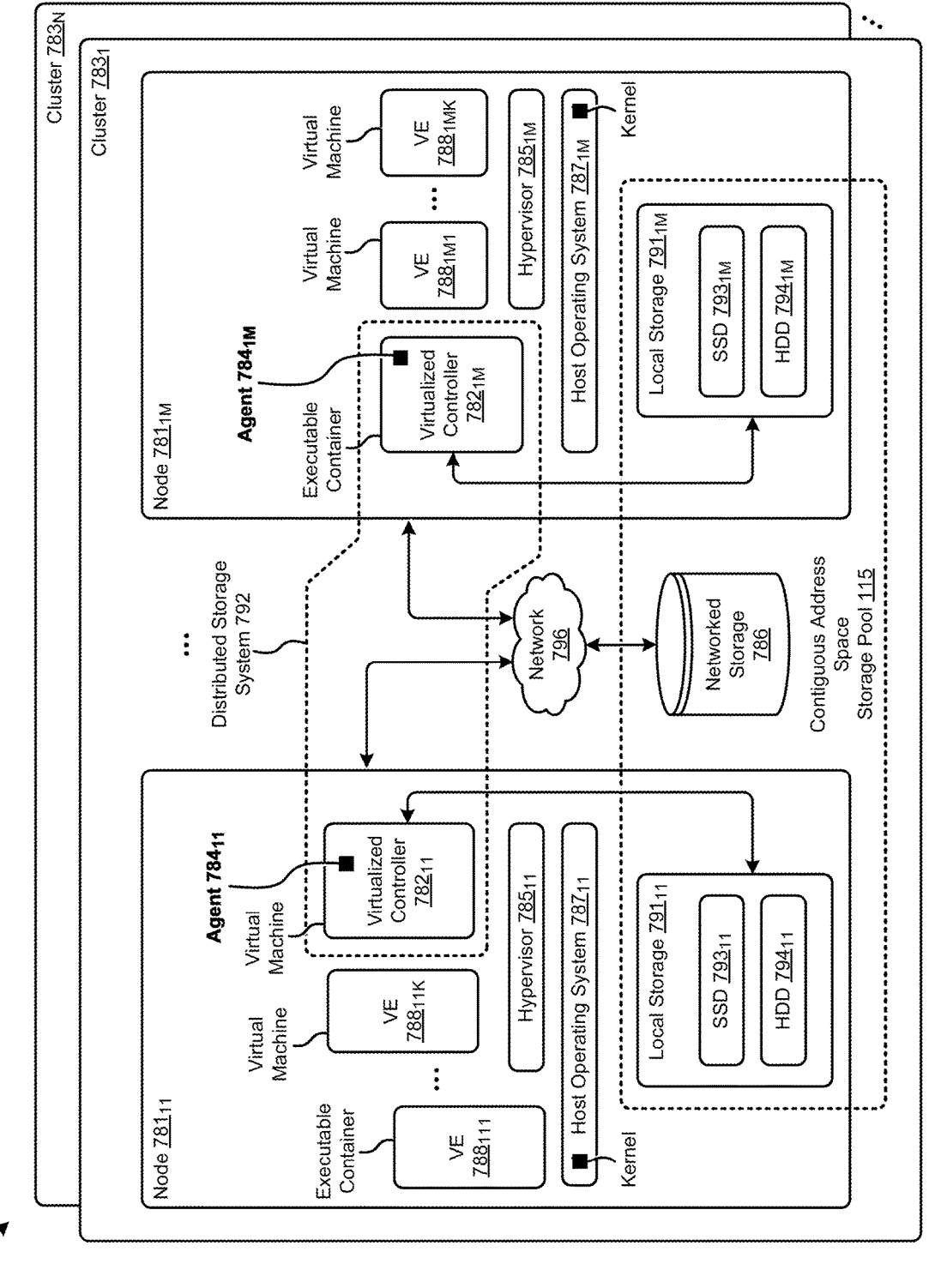

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$)

and contiguous address space storage pool 115 associated with cluster 783$_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage 791$_{11}$, . . . , local storage 791$_{1M}$). For example, the local storage can be within or directly attached to a server and/or appliance associated with the nodes. Such local storage can include solid state drives (SSD 793$_{11}$, . . . , SSD 793$_{1M}$), hard disk drives (HDD 794$_{11}$, HDD 794$_{1M}$), and/or other storage devices.

As shown, any of the nodes of the distributed virtualization system can implement one or more user virtualized entities (e.g., VE 788$_{11l}$, VE 788$_{11K}$, VE 788$_{1M1}$, VE 788$_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 787$_{11}$, . . . , host operating system 787$_{1M}$), while the VMs run multiple applications on various respective guest operating systems. Such flexibility can be facilitated at least in part by a hypervisor (e.g., hypervisor 785$_{11}$, . . . , hypervisor 785$_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system 787$_{11}$, . . . , host operating system 787$_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to contiguous address space storage pool 115 by the VMs and/or the executable containers.

Multiple instances of such virtualized controllers can coordinate within a cluster to form the distributed storage system 792 which can, among other operations, manage the contiguous address space storage pool 115. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node 781$_{11}$ can interface with a controller virtual machine (e.g., virtualized controller 782$_{11}$) through hypervisor 785$_{11}$ to access data of contiguous address space storage pool 115. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller 782$_{1M}$) in an operating system virtualization environment at a given node. In this case, for example, the virtualized entities at node 781$_{1M}$ can access the contiguous address space storage pool 115 by interfacing with a controller container (e.g., virtualized controller 782$_{1M}$) through hypervisor 785$_{1M}$ and/or the kernel of host operating system 787$_{1M}$.

In certain embodiments, one or more instances of an agent can be implemented in the distributed storage system 792 to facilitate the herein disclosed techniques. Specifically, agent 784$_{11}$ can be implemented in the virtualized controller 782$_{11}$, and agent 784$_{1M}$ can be implemented in the virtualized controller 782$_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to performing on-the-fly configuration of different virtualization system images to deploy onto heterogeneous nodes that comprise the computing cluster can be brought to bear through implementation of any one or more of the foregoing embodiments. Moreover, any aspect or aspects of bringing-up computing clusters formed of heterogeneous nodes that need different but correlated virtualization system images can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor, cause acts comprising:

identifying a set of candidate nodes, the set of candidate nodes being distributed across first and second cloud environments;

identifying a subset of nodes of the set of candidate nodes that can be configured to be included in a cluster distributed across the first and second cloud environments and interconnected using a common subnet; and bringing up a cluster comprising the subset of nodes by exchanging communications between each node of the subset of nodes over the same common subnet, at least by:

defining a logical subnet across the first and second cloud environments; and deploying one of two or more configurations to respective nodes of a portion of the subset of nodes to form the cluster, wherein the two or more configurations comprise virtualization system images, a first virtualization system image corresponding to the first cloud environment and a second virtualization system image corresponding to the second cloud environment, the virtualization system images are configured to be node specific, each node of the subset of nodes is assigned a network identity and a cluster identity in a corresponding virtualization system image, the network identity is associated with the cluster identity, and each node of the subset of nodes knows which nodes have been assigned into the cluster, and the common subnet forms a communication path for the portion of the subset of nodes that form the cluster, the cluster spanning the first and second cloud environments, and the configurations of the respective nodes of the portion of the subset of nodes cause the subset of nodes to self-assemble using the common subnet.

2. The non-transitory computer readable medium of claim 1, wherein the acts further comprise provisioning networking equipment to form an isolated network for the cluster using a private VxLAN as an overlay and provisioning a tenant-specific secure underlay within the private VxLAN.

3. The non-transitory computer readable medium of claim 1, wherein the cluster indicates readiness to process a workload after completing self-assembly.

4. The non-transitory computer readable medium of claim 1, wherein the first cloud environment comprises a first heterogeneous pool of on-premises nodes and the second cloud environment comprises a second heterogeneous pool of: nodes of a public cloud facility, nodes of a bare metal provider, or specialized nodes.

5. The non-transitory computer readable medium of claim 1, wherein the common subnet further spans a third cloud environment, and one or more nodes of the third cloud environment are configured to cause the one or more nodes to self-assemble with the subset of nodes using the common subnet.

6. The non-transitory computer readable medium of claim 1, wherein the virtualization system images are configured such that, when executed, the portion of the subset of nodes are able to communicate with each other to self-assemble themselves into a cluster.

7. The non-transitory computer readable medium of claim 1, wherein the virtualization system images are configured by one or more of: (1) assigning node-specific identities, (2) assigning an initial leader, (3) setting of initial environment-specific parameters, (4) setting parameters for an initial networking configuration, (5) setting an initial networking configuration for communications between first and second cloud environments, or (6) setting parameters for accepting commands or other messages from on-cluster or external control systems.

8. The non-transitory computer readable medium of claim 1, wherein the first cloud environment comprises a first heterogeneous pool of: nodes of a public cloud facility, nodes of a bare metal provider, on-premises nodes, or specialized nodes, and the second cloud environment comprises a second heterogeneous pool of: nodes of a public cloud facility, nodes of a bare metal provider, on-premises nodes, or specialized nodes.

9. A method comprising:

identifying a set of candidate nodes, the set of candidate nodes being distributed across first and second cloud environments;

identifying a subset of nodes of the set of candidate nodes that can be configured to be included in a cluster distributed across the first and second cloud environments and interconnected using a common subnet; and bringing up a cluster comprising the subset of nodes by exchanging communications between each node of the subset of nodes over the same common subnet, at least by:

defining a logical subnet across the first and second cloud environments; and deploying one of two or more configurations to respective nodes of a portion of the subset of nodes to form the cluster, wherein the two or more configurations comprise virtualization system images, a first virtualization system image corresponding to the first cloud environment and a second virtualization system image corresponding to the second cloud environment, the virtualization system images are configured to be node specific, each node of the subset of nodes is assigned a network identity and a cluster identity in a corresponding virtualization system image, the network identity is associated with the cluster identity, and each node of the subset of nodes knows which nodes have been assigned into the cluster, and the common subnet forms a communication path for the portion of the subset of nodes that form the cluster, the cluster spanning the first and second cloud environments, and the configurations of the respective nodes of the portion of the subset of nodes cause the subset of nodes to self-assemble using the common subnet.

10. The method of claim 9, further comprising provisioning networking equipment to form an isolated network for the cluster using a private VxLAN as an overlay and provisioning a tenant-specific secure underlay within the private VxLAN.

11. The method of claim 9, wherein the cluster indicates readiness to process a workload after completing self-assembly.

12. The method of claim 9, wherein the first cloud environment comprises a first heterogeneous pool of on-premises nodes and the second cloud environment comprises a second heterogeneous pool of: nodes of a public cloud facility, nodes of a bare metal provider, or specialized nodes.

13. The method of claim 9, wherein the common subnet further spans a third cloud environment, and one or more nodes of the third cloud environment are configured to cause the one or more nodes to self-assemble with the subset of nodes using the common subnet.

14. The method of claim 9, wherein the virtualization system images are configured such that, when executed, the portion of the subset of nodes are able to communicate with each other to self-assemble themselves into a cluster.

15. The method of claim 9, wherein the virtualization system images are configured by one or more of: (1) assigning node-specific identities, (2) assigning an initial leader, (3) setting of initial environment-specific parameters, (4) setting parameters for an initial networking configuration, (5) setting an initial networking configuration for communications between first and second cloud environments, or (6) setting parameters for accepting commands or other messages from on-cluster or external control systems.

16. The method of claim 9, wherein the first cloud environment comprises a first heterogeneous pool of: nodes of a public cloud facility, nodes of a bare metal provider, on-premises nodes, or specialized nodes, and the second cloud environment comprises a second heterogeneous pool of: nodes of a public cloud facility, nodes of a bare metal provider, on-premises nodes, or specialized nodes.

17. A computing system comprising:

a storage medium having stored thereon a sequence of instructions; and a processor that executes the sequence of instructions to cause a set of acts comprising:

identifying a set of candidate nodes, the set of candidate nodes being distributed across first and second cloud environments;

identifying a subset of nodes of the set of candidate nodes that can be configured to be included in a cluster distributed across the first and second cloud environments and interconnected using a common subnet; and bringing up a cluster comprising the subset of nodes by exchanging communications between each node of the subset of nodes over the same common subnet, at least by:

defining a logical subnet across the first and second cloud environments; and deploying one of two or more configurations to respective nodes of a portion of the subset of nodes to form the cluster, wherein the two or more configurations comprise virtualization system images, a first virtualization system image corresponding to the first cloud environment and a second virtualization system image corresponding to the second cloud environment, the virtualization system images are configured to be node specific, each node of the subset of nodes is assigned a network identity and a cluster identity in a corresponding virtualization system image, the network identity is associated with the cluster identity, and each node of the subset of nodes knows which nodes have been assigned into the cluster, and the common subnet forms a communication path for the portion of the subset of nodes that form the cluster, the cluster spanning the first and second cloud environments, and the configurations of the respective nodes of the portion of the subset of nodes cause the subset of nodes to self-assemble using the common subnet.

18. The computing system of claim 17, wherein the set of acts further comprise provisioning networking equipment to form an isolated network for the cluster using a private VxLAN as an overlay and provisioning a tenant-specific secure underlay within the private VxLAN.

19. The computing system of claim 17, wherein the cluster indicates readiness to process a workload after completing self-assembly.

20. The computing system of claim 17, wherein the first cloud environment comprises a first heterogeneous pool of on-premises nodes and the second cloud environment comprises a second heterogeneous pool of: nodes of a public cloud facility, nodes of a bare metal provider, or specialized nodes.

21. The computing system of claim 17, wherein the common subnet further spans a third cloud environment, and one or more nodes of the third cloud environment are configured to cause the one or more nodes to self-assemble with the subset of nodes using the common subnet.

22. The computing system of claim 17, wherein the virtualization system images are configured such that, when executed, the portion of the subset of nodes are able to communicate with each other to self-assemble themselves into a cluster.

23. The computing system of claim 17, wherein the virtualization system images are configured by one or more of: (1) assigning node-specific identities, (2) assigning an initial leader, (3) setting of initial environment-specific parameters, (4) setting parameters for an initial networking configuration, (5) setting an initial networking configuration for communications between first and second cloud environments, or (6) setting parameters for accepting commands or other messages from on-cluster or external control systems.

24. The computing system of claim 17, wherein the first cloud environment comprises a first heterogeneous pool of: nodes of a public cloud facility, nodes of a bare metal provider, on-premises nodes, or specialized nodes, and the second cloud environment comprises a second heterogeneous pool of: nodes of a public cloud facility, nodes of a bare metal provider, on-premises nodes, or specialized nodes.

* * * * *